United States Patent [19]

Parent

[11] 4,056,715

[45] Nov. 1, 1977

[54] DEVICE FOR FORMING CHANNELS USING DETECTORS SPACED OUT ON A CIRCULAR BASE

[75] Inventor: Guy Parent, Le Plessis Robinson, France

[73] Assignee: Compagnie Industrielle des Telecommunications Cit-Alcatel, Paris, France

[21] Appl. No.: 636,888

[22] Filed: Dec. 2, 1975

[30] Foreign Application Priority Data

Dec. 10, 1974  France ................................ 74.40458

[51] Int. Cl.² .............................................. G01S 3/00
[52] U.S. Cl. ................................ 364/514; 343/113 R; 340/6 R
[58] Field of Search ................. 235/151.3; 343/113 R; 340/6 R, 16 R

[56] References Cited

U.S. PATENT DOCUMENTS

| 3,370,267 | 2/1968 | Barry .................................... 340/6 R |
| 3,449,711 | 6/1969 | Ricketts, Jr. et al. ........ 343/113 R X |
| 3,691,514 | 9/1972 | Goursolas, et al. .......... 343/113 R X |
| 3,792,479 | 2/1974 | Faugeras, et al. ................ 343/113 R |
| 3,835,448 | 9/1974 | Bertheas ................................ 340/6 R |
| 3,946,395 | 3/1976 | Kirchhoff .......................... 343/113 R |
| 3,947,805 | 3/1976 | Faugeras, et al. ............ 343/113 R X |

Primary Examiner—Edward J. Wise
Attorney, Agent, or Firm—Sughrue, Rothwell, Mion, Zinn and Macpeak

[57] ABSTRACT

Device for forming channels using detectors spaced out on a circular base, comprising detectors evenly spaced out and followed by coders, means for distributing the data supplied by those coders, a chain constituted by an alternate sequence of delay devices and adders; the distributing means are simplified and comprise an input shift register associated with buffer memories. Application to the determining of the propagation of a plane wave in sonars.

18 Claims, 8 Drawing Figures

DEVICE FOR FORMING CHANNELS USING DETECTORS SPACED OUT ON A CIRCULAR BASE

The present invention relates to a device for forming channels using detectors spaced out on a circular base and enabling the determining of the direction of propagation of a plane wave by detection of that were in several predetermined directions evenly spaced out in a plane within an arc or angle $a$.

Such a device, applicable in sonars or radars, is described in U.S. Pat. No. 3,792,479 and comprises:

A sequence of H detectors evenly spaced out on the base;

H coders, each coder being connected to the output of a detector and being used for transcoding the analog output signal of the detector into a signal having $s$ bits ($s \geq 1$);

A chain constituted by an alternate sequence of (N − 1) delay devices and of (N−1) main adders (2N−1>H), each main adder comprising an input A connected to the output of a delay device and a lateral input B, (N − 1) secondary adders, the output of each secondary being connected to the lateral input B of a main adder, each delay device comprising at least an elementary delay cell; distributing means for the signals sent out by the coders to the input of the chain and to the inputs of the (N − 1) secondary adders;

A clock used for controlling the said distributing means at the frequency $F_H$, the data staying only during a period of $1/F_H$ in an elementary cell and for controlling the transfer of the signals along the chain.

According to a known variant, the device comprises N secondary adders, the outpt of one of the secondary adders being connected to the input of the chain and each output of the (N − 1) others being connected to the lateral input B of a main adder, the distributing means then distributing the signals sent out by the coders on the inputs of the N secondary adders.

The said distributing means are constituted by 2 N−1 or 2 N multiplexers each having H inputs which represent a very great quantity of equipment.

The aim of the present invention is to simplify the said distributing means.

The device for forming channels using detectors spaced out on a circular base comprises a sequence of H detectors evenly spaced out on the said base within an angle $a$, H coders, each coder being connected to the output of a detector and being used for transcoding the analog output signal of the detector into a signal having $s$ bits ($s \geq 1$);

A chain constituted by an alternate sequence of (N − 1) delay devices and by (N − 1) main adders (2N − 1 $\geq$ H), each main adder comprising an input A connected to the output of a delay device and a lateral input B, each delay device comprising at least an elementary delay cell, (N − 1) secondary adders, the output of each secondary adder being connected to the lateral input B of a main adder, distributing means for the signals sent out by the coders to the input of the chain and to the inputs of the (N − 1) secondary adders; a clock used for controlling the said distributing means at the frequency $F_H$, the data staying only during a period $1/F_H$ in an elementary cell and for controlling the transfer of the signals along the chain and is characterized in that the said distribution means comprise means for sampling and memorizing the signals coming from the H coders, a bus bar system on which the signals memorized as a whole pass subsequentially, means for sampling, at the frequency $F_H$, the said signals on the bus bar system used for feeding the input of the chain and the inputs of the (N − 1) secondary adders control means for the sampling means.

According to one particularity of the invention, the H coders code the signals in pure binary code.

According to a first variant of the invention, the device for forming channels, is characterized in that the said sampling and memorizing means comprise a shift register constituted by H stages, each stage 5 being fed by a coder, the said shift register being filled at the frequency $F_H$, the output of the shift register being connected to the bus bar system comprising only one bar, the said shift register being emptied at the frequency $F_H$ and in that the said sampling means comprise (2N − 1) buffer memories comprising a feed input of a control input unblocking the feed input when it is energized and an output, the feed input of each buffer memory being connected to the bus bar, the output of one of the memories being connected to the input of the chain and the output of each of the 2N − 2 other memories being connected to one of the inputs of one of the (N − 1) secondary adders, the said control inputs being connected to the said control means which supply on each of the control inputs one signal every $1/F_H$, the buffer memories being emptied in the system at the frequency $F_H$.

According to a particular embodiment of that first variant, the control means for the sampling means comprise a shift register having H stages, each stage comprising an input and an output which are parallel, 2N − 1 of those parallel outputs being connected to the control inputs of the 2N − 1 buffer memories, the parallel inputs of the said register being connected to the H outputs of a multiplexer fed by a unit signal distributed sequentially every $1/F_H$ from an output to an output spaced apart by a distance $p$ ($p \geq 1$) by a counter controlled by the clock, the said shift register being charged by the multiplexer every $1/F_H$ and the circulating of the unit signal in the H stages being effected at the frequency $Fd = H.F_H$.

The counter can, to great advantage, be provided with means making it possible to make the number $p$ of outputs jumped vary.

According to a second variant of the invention which affords a particular advantage, when the frequency H $F_H$ becomes too high, the memorizing means comprise $k$ input shift registers, $k$ being a sub-multiple of H, each input register comprising H/$k$ stages, each stage being fed by a coder, the said input shift registers being filled at a frequency $Fv = F_H/k$ and read every $1/FV$, the outputs of the said shift registers being connected to a bus bar system comprising $k$ bars in parallel, each of them being connected to the output of an input shift register and in that the sampling means comprise 2N − 1 pairs of sampling shift registers constituted by $k$ stages each, each pair of registers comprising a register which registers when the other discharges, the input of each stage being connected to a bus bar, the output of one of the pairs of registers being connected to the input of the chain, the outputs of the other parts being connected to the inputs of the (N − 1) secondary adders, the unblocking of the parallel inputs of the sampling registers being effected by control means, the stages of the sampling registers being emptied at the frequency $F_H$.

According to a particular embodiment of that second variant, the control means comprise an address register forming a looped circuit and constituted by $H/k$ stages whose parallel inputs are connected to the outputs of a multiplexer having $H/k$ outputs, the said multiplexer being fed by a unit signal distributed sequentially at the frequency $Fv$ from an output of the multiplexer to the following output, the said address register being charged by the said multiplexer every $1/Fv$, the circulating of the unit signal in the $M/k$ stages of the address register being effected at the frequency $F'd = H/k.Fv$, the signals obtained on the parallel outputs of the $H/k$ stages being used for unbocking the parallel inputs of the stages of the $2N - 1$ pairs of sampling registers, the unblocking of $(k - h)$ stages of each register of each pair being controlled by the same stage of the address register, the remaining $h$ stages being controlled by the following stage of the address register, $h$ being able to assume values ranging from 0 to $k - 1$ according to the pair of sampling registers considered.

Accoring to a third variant of the invention affording a particular advantage when the frequency $H.F_H$ becomes too high, and when the member $2N - 1$ is greater than $H/k$, the device for forming channels is characterized in that the sampling and memorizing means comprise $k$ input shift registers, $k$ being a submultiple of $H$, each input register comprising $H/k$ stages, each stage being fed by a coder, the said input shift registers being filled at a frequency $Fv = F_H/k$ and read every $1/Fv$, the outputs of the said shift registers being connected to a bus bar system comprising $k$ bars in parallel, each of them being connected to the output of a shift register and in that the sampling means comprise at the most $H/k$ groups of 4 sampling shift registers, each group being constituted by 2 pairs of registers and each pair being constituted by a first and a second register in series, each group comprising a pair of registers which register when the other discharges, the parallel input of the $i^{th}$ stage of each register of each group being connected to the $i^{th}$ bus bar, $i$ assuming all the values from 1 to $k$, the input of the system as well as each input of each secondary adder being connected to the output of an associated switch comprising two inputs, one of the inputs of each switch being connected to the parallel output of one of the $k$ stages of the first register of one of the pairs of a determined group, the other input being connected to the parallel output of the stage having the same order of the first register of the other pair of the same group, the unblocking of the parallel inputs of the sampling registers being effected by control means, $k$ consecutive stages of the pairs of sampling registers being emptied at the frequency $F_H$.

According to a particular embodiment of that third variant, the control means comprise an address register forming a looped circuit and constituted by $H/k$ stages whose parallel inputs are connected to the outputs of a multiplexer having $H/k$ outputs, the said multiplexer being fed by a unit signal distributed sequentially at the frequency $Fv$ from an output of the multiplexer to the following output, the said address register being charged by the said multiplexer every $1/Fv$, the circulating of the unit signal in the $H/k$ stages of the address register being effected at the frequency $F'd = Fv.H/k$, the signals obtained at the parallel outputs of the $H/k$ stages used for unblocking the parallel inputs of the stages of the groups of sampling registers, the unblocking of the $k$ stages of the first register of a pair of a group being controlled by a stage of the address register, the $k$ stages of the second register of the same pair being controlled by the following stage of the address register.

According to another embodiment of the invention, that device for forming channels using detectors spaced out on a circular base comprises a sequence of H detectors, evenly spaced out on the said base within an angle a, H coders, each coder being connected to the output of a detector and being used for transcoding the analog output signal of the detector into a signal having $s$ bits ($s \geq 1$);

A chain constituted by an alternate sequence of $(N - 1)$ delay devices and by $(N - 1)$ main adders ($2N < H$), each main adder comprising an input A connected to the output of a delay device and a lateral input B, each delay device comprising at least an elementary delay cell, N secondary adders, the output of one of the secondary adders being connected to the input of the system and each output of the $(N - 1)$ others being connected to the lateral input B of a main adder, distributing means for the signals sent out by the coders to the inputs of the N secondary adders; a clock used for controlling the said distributing means at the frequency $F_H$, the data staying only during a period $1/F_H$ in an elementary cell and for controlling the transfer of the signals along the chain, is characterized in that the said distribution means comprise means for sampling and memorizing the signals coming from the H coder, a bus bar system on which the signals memorized as a whole pass sequentially, means for sampling, at the frequency $F_H$, the said signals on the bus bar system used for feeding the inputs of the N secondary adders, control means for the sampling means.

According to one particularly of that other embodiment of the invention, the H coders code the signals in pure binary code.

According to a fourth variant of the invention, the device for forming channels is characterized in that the said sampling and memorizing means comprise a shift register constituted by H stages, each stage being fed by a coder, the said shift register being filled at the frequency $F_H$, the output of the shift register being connected to the bus bar system comprising only one bar, the said shift register being emptied at the frequency $F_H$ and in that the said sampling means comprise (2N) buffer memories comprising a feed input, a control input unblocking the feed input when it is energized and an output, the feed input of each buffer memory being connected to the bus bar, the output of each of the 2N memories being connected to the input of one of the secondary adders, the said control inputs being connected to the said control means supply on each of the control inputs one signal every $1/F_H$, the buffer memories being emptied in the chain at the frequency $F_H$.

According to a particular embodiment of that fourth variant, the control means of the sampling means comprise a shift register having H stages, comprising an input and an output which are parallel, 2N of those parallel outputs being connected to the control inputs of the 2N buffer memories, the parallel inputs of the said register being connected to the H outputs of a multiplexer fed by a unit signal distributed sequentially every $1/F_H$ from an output to an output spaced apart by a distance $p$ ($p \geq 1$) by a counter controlled by the clock, the said shift register being charged by the multiplexer every $1/F_H$ and the circulating of the unit signal in the H stages being effected at the frequency $Fd = H.F_H$.

The counter can, to great advantage, be provided with means making it possible to make the number $p$ of outputs jumped vary.

According to a fifth variant of the invention which affords a particular advantage, when the frequency H $F_H$ becomes too high, the memorizing means comprise $k$ input shift registers, $k$ being a submultiple of H, each input register comprising H/$k$ stages, each stage being fed by a coder, the said input shift registers being filled at a frequency $Fv = F_H/k$ and read every 1/$Fv$, the outputs of the said shift registers being connected to a bus bar system comprising $k$ bars in parallel, each of them being connected to the output of an input shift register, and in that the sampling means comprise 2N pairs of sampling shift registers, each constituted by $k$ stages each, each pair of registers comprising a register which registers when the other discharges, the input of each stage being connected to a bus bar, the outputs of the pairs of registers being connected to the inputs of the N secondary adders, the unblocking of the parallel inputs of the sampling registers being effected by control means, the stages of the sampling registers being emptied at the frequency $F_H$.

According to a particular embodiment of that fifth variant, the control means comprise an address register forming a looped circuit and constituted by H/$k$ stages whose parallel inputs are connected to the outputs of a multiplexer having H/$k$ outputs, the said multiplexer being fed by a unit signal distributed sequentially at the frequency $Fv$ from an output of the multiplexer to the following output, the said address register being charged by the said multiplexer every 1/$Fv$, the circulating of the unit signal in the H/$k$ stages of the address register being effected at the frequency $Fd = H/kFv$, the signals obtained on the parallel outputs of the H/$k$ stages being used for unblocking the parallel inputs of the stages of the N pairs of sampling registers, the unblocking of the ($k - h$) stages of each register of each pair being controlled by the same stage of the address register, the remaining $h$ stages being controlled by the following stage of the address register, $h$ being able to assume values ranging from 0 to $k - 1$ according to the pair of sampling registers considered.

According to the sixth variant of the invention which affords a particular advantage, when the frequency H.$F_H$ becomes too high and when the number 2N is greater than H/$k$, the device for forming channels is characterized in that the sampling and memorizing means comprise $k$ input shift registers, $k$ being a submultiple of H, each input register comprising H/$k$ stages, each stage beinfg fed by a coder, the said input shift registers being filled at a frequency $Fv = F_H/k$ and read every 1/$Fv$, the outputs of the said shift registers being connected to a bus bar system comprising $k$ bars in parallel, each of them being connected to the output of a shift register and in that the sampling means comprise at the most H/$k$ groups of 4 sampling shift registers, each group being constituted by 2 pairs of registers and each pair being constituted by a first and a second register in series, each group comprising a pair of registers which register when the other discharges, the parallel input of the $i^{th}$ stage of each register of each group being connect to the $i^{th}$ bus bar, $i$ assuming all the values from 1 to $k$, each of the inputs of each secondary adder being connected to the output of an associated switch comprising two inputs, one of the inputs of each switch being connected to the parallel output of one of the $k$ stages of the first register of one of the pairs of a determined group, the other input being connected to the parallel output of the stage having the same order of the first register of the other pair of the same group, the unblocking of the parallel inputs of the sampling registers being effected by control means, $k$ consecutive stages of the pairs of sampling registers being emptied at the frequency $F_H$.

According to a particular embodiment of that sixth variant, the control means comprise an address register forming a looped circuit and constituted by H/$k$ stages whose parallel inputs are connected to the outputs of a multiplexer having H/$k$ outputs, the said multiplexer being fed by a unit signal distributed sequentially at the frequency $Fv$ from an output of the multiplexer to the following output, the said address register being charged by the said multiplexer every 1/$Fv$, the circulating of the unit signal in the H/$k$ stages of the address register being effected at the frequency $Fd = Fv.H/k$, the signals obtained on the parallel outputs of the H/$k$ stages being used for unblocking the parallel inputs of the stages of the groups of sampling registers, the unblocking of the $k$ stages of the first register of a pair of a group being controlled by a stage of the address register, the $k$ stages of the second register of the same pair being controlled by the following stage of the address register.

The invention will be better understood on referring to the following description in which FIG. 1 shows a device for forming channels of a known type;

Figure 1:
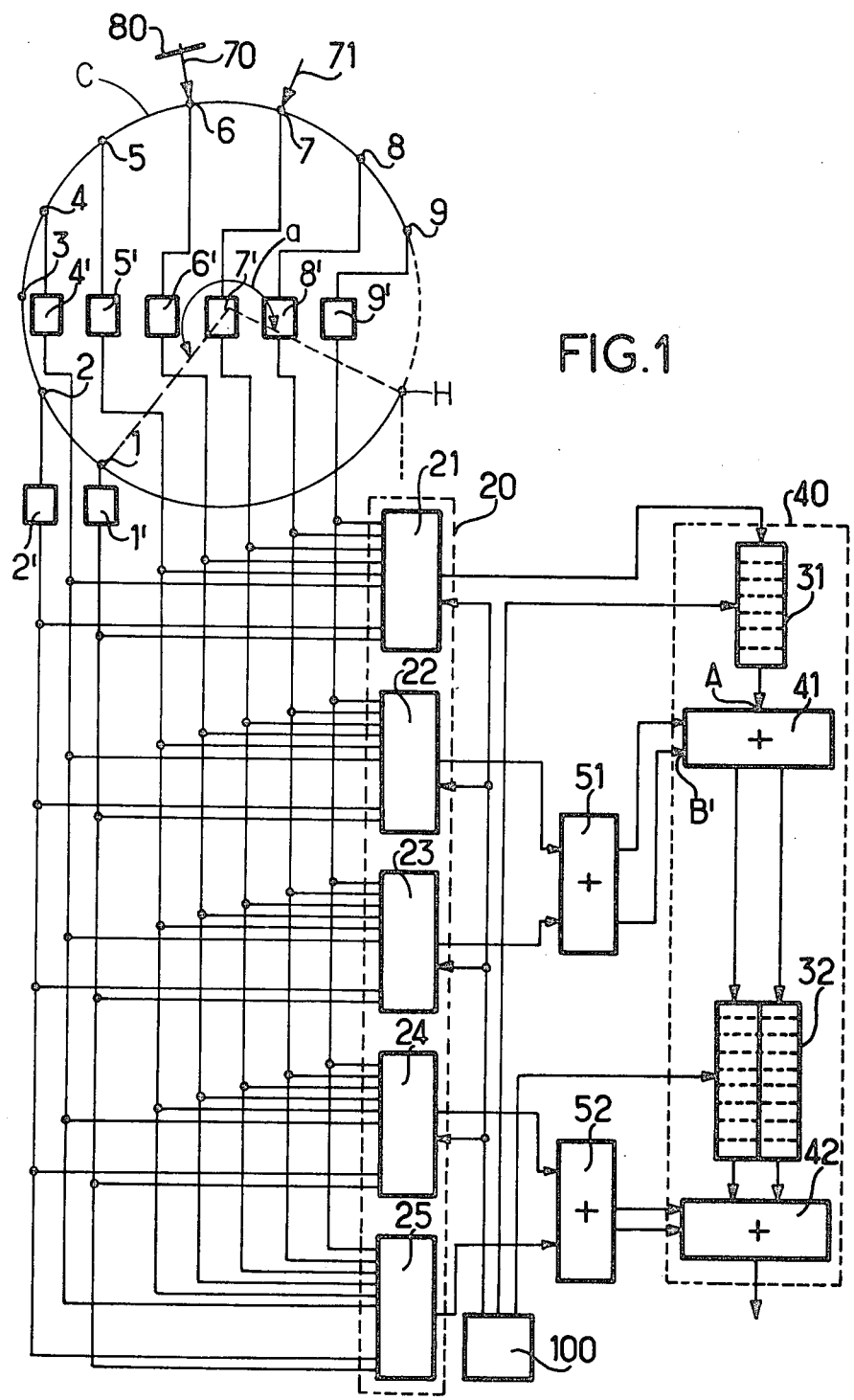
FIG. 1 shows a device for forming channels of a known type.

That device comprises H detectors numbered from 1 to H, spaced out regularly along an arc or angle a of a circular hose C. Each detector such as 1 is connected to a coder such as 1' which codes in pure binary code the signal supplied by the associated detector 1. (The coders 1', 2', ..., can be, to great advantage, constituted by peak limiters). The outputs of all the coders are connected together to a distributing device 20 constituted by 2N − 1 multiplexers 21, 22, 23, 24, 25 having H inputs.

The device comprises also a chain 40 comprising an alternate sequence of (N − 1) delay devices 31, 32, and of (N − 1) main adders 41, 42.

Each main adder comprises an input A connected to the output of the preceding delay device and a lateral input B. The main adder calculates the sum of the signals received on its inputs A and B, the signals received by the inputs A and B possibly being signals having several bits in parallel.

Each delay device comprises a certain number of elementary delay cells.

Each cell can delay by $\tau$ a signal formed by $n$ bits set in parallel.

The device comprises, moreover $N - 1$ secondary adders 51, 52, each comprising two inputs and an output. The output of each secondary adder such as 51, 52 is connected to the lateral input B of a main adder such as 41, 42.

The output of the multiplexer 21 is connected to the input of the system 40 and hence of the delay device 31 and the outputs of the multiplexers 22 and 23 are connected to the inputs B of the secondary adder 51 and the outputs of the multiplexers 24 and 25 are connected to the inputs of the secondary adder 52.

A direction of propagation 70 of a plane wave 80 whose frequency is $F_S$ is made to correspond to each group of $2N - 1$ consecutive detectors; the direction of propagation 70 passing through the center of the circumference C is an axis of the symmetry for the grouping of $(2N - 1)$ detectors.

Let it be assumed that the wave 80 propagating in the direction 70 reaches firstly the detector 6. The detectors 5 and 7 will then be reached, then the detectors 4 and 8. The delay of the device 31 will be fixed at $n_1\tau$, $n_1\tau$ being the difference between the times taken by the wave which is supposed to propagate in the direction 70 to reach the detector 6 and the detectors 5 and 7.

The delay device 31 therefore comprises $n_1$ elementary delay cells.

The delay device 32 comprises $n_2$ elementary delay cells, $n_2\tau$ being equal to the propagation time of the wave in the direction 70 between the detectors 5 and 7 and the detectors 4 and 8.

More generally, the $p^{th}$ delay device comprises $n_p$ elementary delay cells, $n_p\tau$ being equal to the propagation time of the wave in the direction 70 between the 2 detectors reached in the $p^{th}$ instances and the 2 detectors reached in the $(p + 1)^{th}$ instances.

To see if the propagation occurs in the direction 70, the channel corresponding to the direction 70 is formed; the output of the coder 6' associated with the detector 6 must be applied, for that purpose, by means of the multiplexer 21, to the input of the delay device 31 then, $n_1\tau$ later, the output of the coder 5' associated with the detector 5 must be applied by means of the multiplexer 22 to an input of the secondary adder 51 and through the multiplexer 23, the output of the coder 7' associated with the detector 7 must be applied to the other input of the secondary adder 51, then $n_2\tau$ later, the output of the coder 4' associated with the detector 4 must be applied by means of the multiplexer 24 on an input of the secondary adder 52 and the output of the coder 8' associated with the detector 8 must be connected by means of the multiplexer 25 to the other input of the secondary adder 52.

At the output of the chain 40, that is, of the last main adder 42, a signal $S_{70}$ comprising contingently several bits, is obtained.

To see if the propagating of that signal produces in the direction 71 shifted to the right in relation to the direction 70 of an angle equal to the arc separting two consecutive detectors, it is sufficient to apply the signals coming from the coders associated with the detectors 7, 6, 8, 5, 9.

The detectors being reached by the wave propagating in the direction 71 in the following order: 7 then simultaneously 7 and 8 then simultaneously 5 and 9, the signal coming from the detector 7 must be applied on the delay device 31, then $n_1\tau$ later, the signals coming from the detectors 6 and 8 must be applied to the secondary adder 51, then $n_2\tau$ later, the signals coming from the detectors 5 and 9 must be applied to the secondary adder 52.

At the output of the main adder 42 which supplies the sum signals $S_{71}$, $P = H - (2N - 2)$ directions, evenly spaced out in a plane along an arc or angle $a$ can thus be obtained.

When the H detectors are spaced out round the whole circumference of the circular base, H directions evenly spaced out in the plane can be obtained, each direction being associated with a group of $(2N - 1)$ detectors.

A clock 100 sends out pulses at the frequency $F_H$, $(F_H = 1/\tau)$ which are applied to the delay cells of the delay devices, this making the signals advance along the chain. Moreover, the pulses of the clock at the frequency $F_H$ are applied to the multiplexers and are used for sampling the signals. The delay devices are constituted by shift registers arranged in parallel, each register being used for the transit of a bit of the signal obtained at the output of an adder.

In the case where $N = 3$, the delay device 31 comprises a single shift register, the delay device 32 which sould be able to make a sum of three binary signals transit comprises two shift registers in parallel.

All the shift registers set in parallel of course have the same member of stages and the stages situated at the same levels constitute an elementary delay cell.

The input of the chain and the inputs of each of the $(N - 1)$ secondary adders are fed every $1/F_H$ by the signals coming from $(2N - 1)$ coders each bearing a determined number and, in the following period $1/F_H$, the input of the system and the lateral input of each adder, each receive the signal coming from a coder whose number is incremented by 1 in relation to the number of the coder which has supplied a signal during preceding period $1/F_H$.

To form P channels:

The P detectors reached in the first instances in each of the channels are applied to the input of the system.

The P detectors reached in the second instances in each of the channels are applied to the first input of the first secondary adder;

The P detectors reached in the $2q^{th}$ instances are applied to the first input of the $q^{th}$ secondary adder;

The P detectors reached in the $(2q + 1)^{th}$ instances are applied to the second input of the $q^{th}$ secondary adder;

And the P detectors reached in the $(2N - 1)^{th}$ instances are applied to the second input of the $(N - 1)^{th}$ secondary adder.

In the known device, the signals S of all the groups of detectors and hence of all the channels which are shifted all by a same angle in relation to the neighboring channels are obtained sequentially at the output of the system at the frequency $F_H$. The maximum signal $S_H$ corresponding to a determined channel, supplies the direction of arrival of the plane wave with an approximation which is in the order of the angle separating two consecutive channels.

The signal $S_H$ is obtained with a frequency equal to $F_H$ divided by the number of channels formed.

Figure 2:
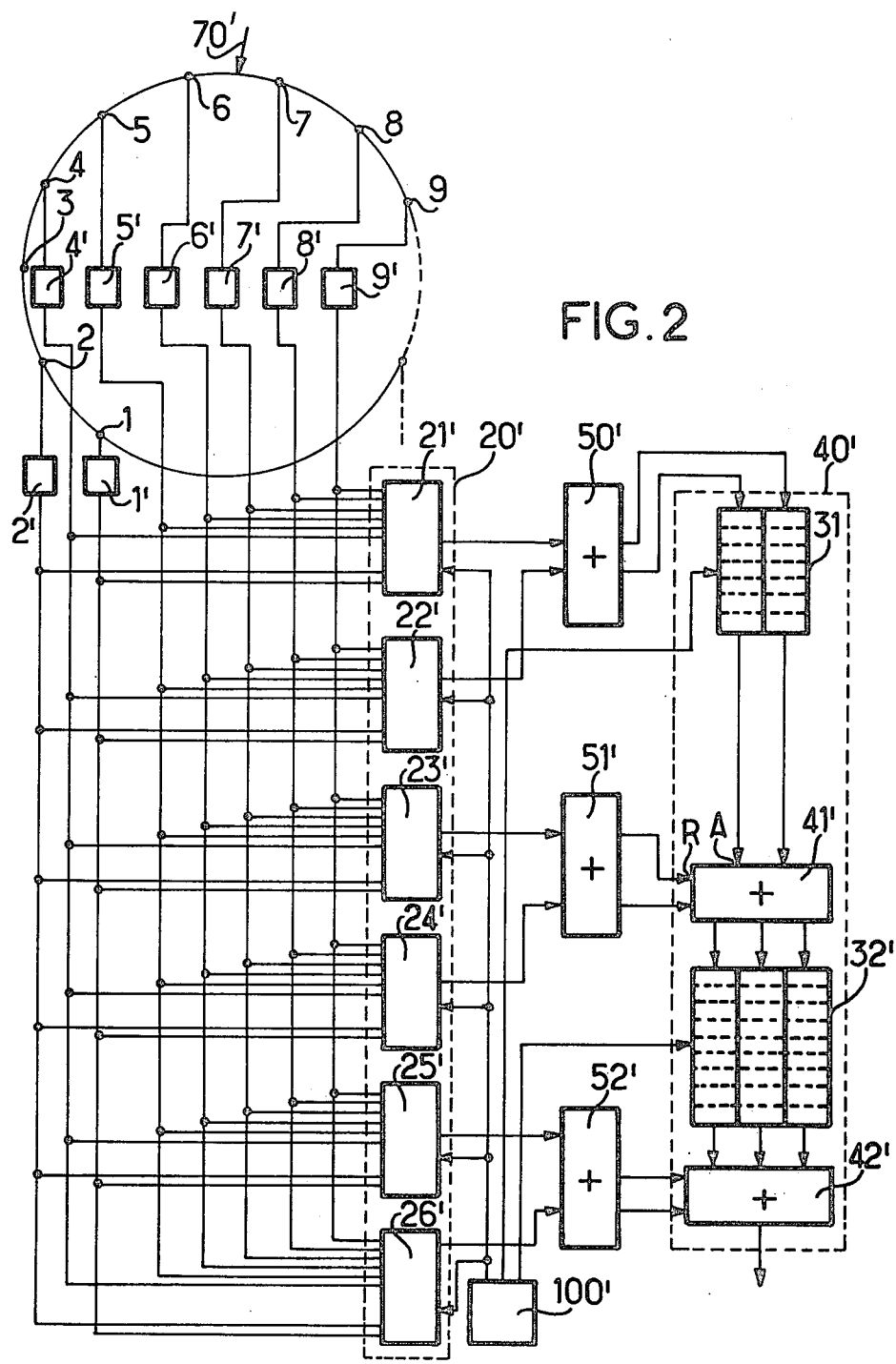
FIG. 2 shows another device for forming channels of a known type.

FIG. 2 shows a second device for forming channels of a known type.

That second device comprises the same elements as the first device in FIG. 1: a chain of H detectors 1, 2, . . . arranged regularly round a circle followed by coders 1', 2', . . . , a chain 40' constituted by an alternate chain of delay devices 31', 32' and of main adders 41', 42' and distributing means 20' constituted by multiplexers 21', 22', 23', 24', 25', 26'. The number of multiplexers is even and no longer odd as in the device in FIG. 1. When the multiplexers are 2N in number, where 2N < H, the chain 40' comprises N − 1 delay devices and N − 1 main adders.

The lateral input of each main adder 41', 42' is connected to the output of a secondary adder having two inputs 51', 52'.

In the second device, the input of the chain 40' is connected to the output of a secondary adder 50'. Each multiplexer 21', 22', 23', 24', 25', 26', has its output connected to an input of one of the N secondary adders 50', 51', 52'.

In the second device, each channel is associated with 2N consecutive detectors and the predetermined directions corresponding to the various channels and passing through the center of the circle C form axes of symmetry, for the 2N detectors associated with the said direction.

In the example constituted, N is equal to 3, so that the detectors 6-7, 5-8, 4-9 are associated witht a determined direction 70'.

The direction 70' is an axis of symmetry for the detectors 6-7, 5-8, 4-9.

At a given moment, the multiplexers 21' and 22' apply the outputs of the coders 6' and 7' to the inputs of the secondary adder 50'; $n_1\tau$ later, the multiplexers 23' and 24' apply the outputs of the coders 5' and 8' to the inputs of the secondary adder 51' and $n_2\tau$ later, the multiplexers 25' and 26' apply the outputs of the coders 4' and 9' to the inputs of the secondary adder 52'.

The delay $n_1\tau$ is equal to the time taken by the plane wave propagating in the direction 70' to pass from the detectors 6-7 to the detectors 5-8 and the delay $n_2\tau$ is equal to the time taken by that plane wave to pass from the detectors 5-8 to the detectors 4-9. The delay line 31' comprises $n_1$ elementary delay cells $\tau$ enabling the delaying of the signals comprising 2 bits in parallel and the delay line 32' comprises $n_2$ elementary delay cells $\tau$ enabling the delaying of the signals comprising 3 bits in parallel.

The clock 100 controlling the advance of the data along the system 40' supplies pulses at the frequency $F_H$ equal to $1/\tau$.

Each multiplexer controlled at the frequency $F_H$ distributes sequentially every $\tau$, the output of a coder on an input of a secondary adder (or to the input of the system) increasing the order of the coder by one each time.

To form P channels, the P detectors reached in the first instances in each channel are applied to the first input of the first secondary adder.

The P detectors reached in the second instances in each channel are applied to the second input of the first secondary adder.

The P detectors reached in the $(2q - 1)^{th}$ instances are applied to the first input of the $q^{th}$ secondary adder.

The P detectors reached in the $2q^{th}$ instances are applied to the second input of the $q^{th}$ secondary adder.

The P detectors reached in the $(2N - 1)^{th}$ instances are applied to the first input of the $N^{th}$ secondary adder and the P detectors reached in the $2N^{th}$ instances are applied to the second input of the $N^{th}$ secondary adder.

The number P of channels which can be obtained is equal to H (2N − 1), spaced out evenly along an arc or angle $a$. When the detectors are spaced out through 360°, it is possible to obtain P equal to H channels.

Figure 3:
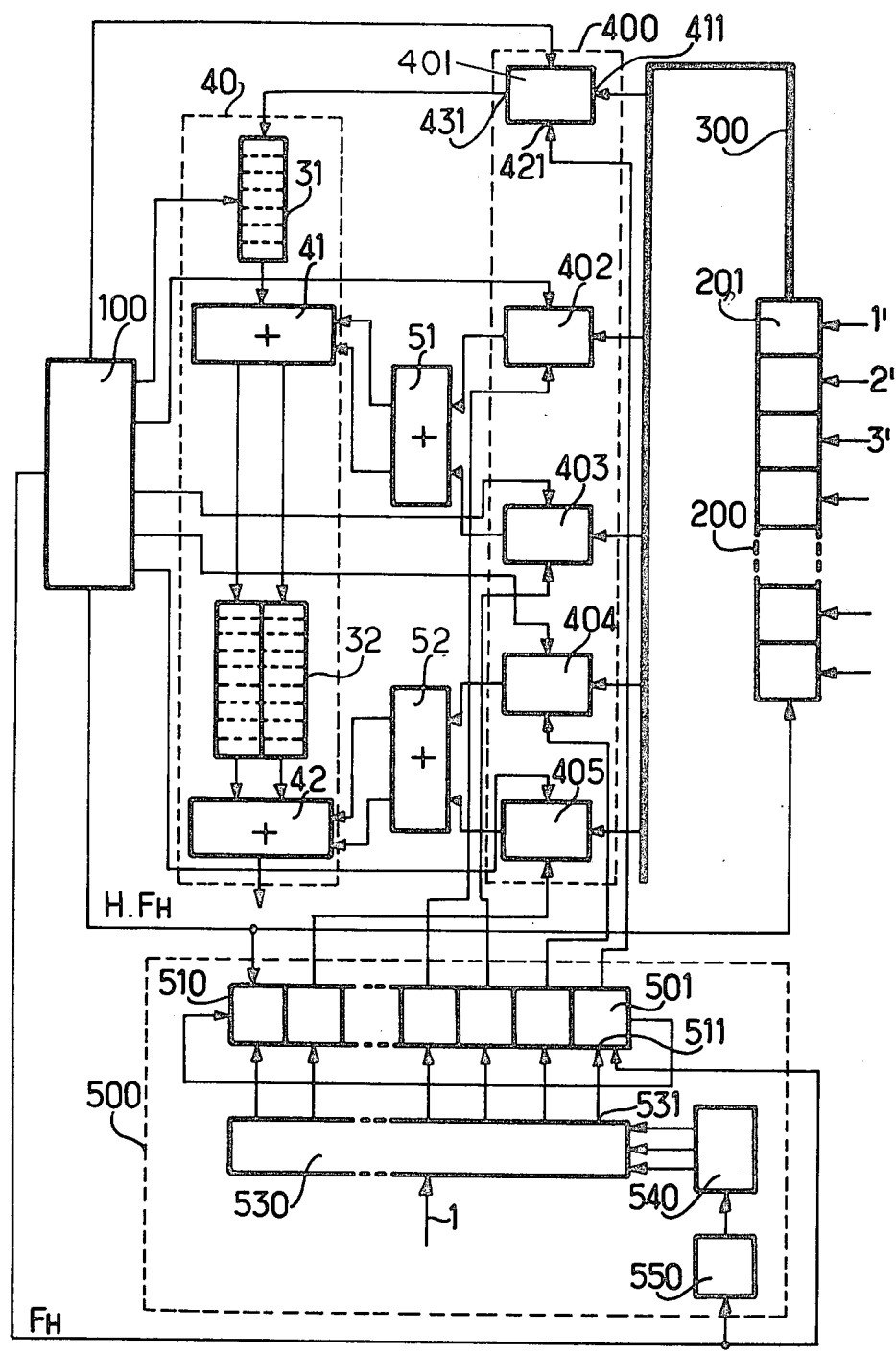
FIG. 3 shows a first variant of the device for forming channels according to the invention.

FIG. 3 shows a first embodiment of the device for forming channels according to the invention.

That device comprises the same elements as the known device in FIG. 1, except for the distributing means 20. It comprises a sequence of H detectors 1 . . . (not shown) arranged evenly in a circle followed by coders 1' . . . (not shown), a chain 40 constituted by an alternate sequence of N − 1 delay devices 31, . . . and of N − 1 main adders 41, . . . as well as N − 1 adders 51, 52, . . .

The distributing means comprise a shift register 200 constituted by H stages 201.

Each stage 201 comprises a parallel input connected to the output of a coder 1' . . .

The output of the register 200 is connected to a bus bar 300.

The shift register is emptied at the frequency $F_H$.

Thus, all the signals coming from the H coders circulate on the bus bar 300.

The device comprises means 400 for sampling the signals on the bus bar 300.

These sampling means are constituted by 2N − 1 buffer memories 401, 402, 403, 404, 405 whose feed inputs 411 are connected to the bus bar 300.

The output 431 of the memory 401 is connected to the input of the system 40 and the outputs of the 2N − 2 other memories are connected to the inputs of the secondary adders associated with the system 40.

The outputs of the memories 402 and 403 are connected to the inputs of the secondary adder 51 and the outputs of the memories 404 and 405 are connected to the inputs of the secondary adder 52.

Each buffer memory such as 401 comprises also a control input 421, which is used for unblocking the feed input of the buffer memory in order that the signal which circulates on the bus bar at the moment when the control input is energized be sampled by the buffer memory.

2N − 1 samplings must therefore be made every $1/F_H$.

The samples are taken at instants $X + a_1$ for the memory 401, $X + a_2$ for the memory 402, $X + a_3$ for the memory 403, $X + a_4$ for the memory 404, $X + a_5$ for the memory 405.

X is an invariable integer from 1 to P increasing by increments of 1 every $1/F_H$, P being the number of channels formed.

When the sampling instant of the first buffer memory 401 is $X + a_1$, the sampling instant of the second memory 402 is $X + a_1 - 1 - \{(P - n_1)\}$, $n_1$ being the number of elementary cells of the delay device 31.

$(P - n_1)$ represents the order number of the channel available in front of the first secondary adder when the channel 1 is available at the input of the chain 40.

1 must be subtracted from X to obtain the sampling instant, for it has been assumed that, at the time of the forming of a channel, the second detector considered was that of lower order.

Hence $a_2 = a_1 - 1 + n_1 - P$ the sampling instant of the third memory 403 is $X + a_1 + 1 - (P - n_1)$.

The $2q^{th}$ sampling instant (for the $2q^{th}$ buffer memory) is given by the relation:

$$X + a_1 - q - \left\{ \sum_{1}^{q-1} (P - n_i) \right\}$$

$n_i$ being the number of elementary cells composing the delay device comprised between the $(i-b\ 1)^{th}$ and the $i^{th}$ main adder; The $(2q+1)^{th}$ sampling instant for the $(2q+1)^{th}$ buffer memory is given by the relation:

$$X + a_1 + q - \left\{ \sum_{1}^{q-1} (P - nq - 1) \right\}$$

It follows that the sampling instants of the 2 buffer memories namely the $2q^{th}$ and the $(2q+1)^{th}$ associated with the first and the second input of the $q^{th}$ secondary adder differ from $2q$.

It should be observed that the expressions whose form is $$\left\{ \sum_{1}^{q-1} (P - n_i) \right\}$$

are calculated modulo P so as to be positive and less than P.

The $(2N - 2)^{th}$ sampling instant (for the $(2N-2)^{th}$ buffer memory associated with the first input of the $(N-1)^{th}$ secondary adder) is:

$$X + a_1 - (N - 1) - \left\{ \sum_{1}^{N-1} (P - n_i) \right\}$$

and the $(2N-1)^{th}$ sampling instant (for the $(2N-1)^{th}$ buffer memory associated with the second input of the $(N-1)^{th}$ secondary adder) is:

$$X + a_1 + (N - 1) - \left\{ \sum_{1}^{N-1} (P - n_i) \right\}$$

The sampling instants are determined by control means 500.

The control means 500 comprise an address register 510 forming a looped circuit and comprising H stages 501. Each stage comprises an input 511 and an output 521 which are parallel.

The parallel inputs 511 are connected to the outputs 531 of a multiplexer 530. That multiplexer is fed by a unit signal and is controlled by a counter 540 which, every $1/F_H$, unblocks a multiplexer output. The unblocked output is the output next to that unblocked a time $1/F_H$ before.

Thus, every $1/F_H$, a stage of the shift register 510 is charged with the unit signal.

If it is required to constitute P channels every 1/Fe (Fe being chosen so as to be greater than $2F_S$), each being associated with a group of $2N-1$ detectors, P successive samplings must be effected every 1/Fe with the $2N-1$ buffer memories. The outputs of $2N-1$ stages of the address register 510 are connected to the control inputs of the $2N-1$ buffer memories. When the unit signal turns in the register 510 with the frequency $Fd = H \times F_H$, the $2N-1$ stages each supply a pulse at the instants $X + a_1, X + a_2, X + a_3, X + a_4, x + a_5$.

For that purpose, those $2N-1$ stages must be suitably chosen taking into account the formulas established for $a_1, a_2, a_3, a_4, a_5$.

At the following period $1/F_H$, by means of the multiplexer 530, a new unit signal is brought into a stage of the register 510 shifted by one place backward in relation to the stage in which the signal 1 had been brought in previously. Due to that arrangement, all the X's can be shifted by 1 at each period $1/F_H$.

The counter 540 is piloted by the frequency $F_H$ and is reset to zero every p pulses. It is possible to shift the signal 1 by p stages of the register 510 every $1/F_H$, this making it possible to form the channels $Vi$, $Vi+p$, $Vi+2p$. To do this, all that is necessary is to feed the counter 540 with the frequency $PF_H$, it being possible to do this by means of an adjustable frequency multiplier 550, fed with the frequency $F_H$.

The clock 100 supplies a pilot signal whose frequency is $F_H$ and a pilot signal whose frequency is $Fd = H \cdot F_H$. The frequency $F_H$ can be obtained by division of the frequency Fd. The frequency $F_H$ pilots the filling of the register 200 by the H coders, the reading and the resetting to zero of the $2N-1$ buffer memories, the advancing of a cell of a delay device for the data contained in the chain 40, the resetting to zero of the register 510 and its filling by the multiplexer 530.

The frequency $Fd = H \cdot F_H$ pilots the reading of the data contained in the register 200 as well as the circulating of the signal 1 in the register 510.

During a period $1/F_H$, the operations are effected in the following order:

Filling of the register 200;

The bringing in of a "1" into the register 510;

The circulating of the data contained in the register 200 on the bar 300 at the frequency $H \cdot F_H$;

The circulating of the "1" at the frequency $H \cdot F_H$ in the register 510 in synchronism;

Sampling of the data circulating on the bar 300 by the buffer memories unblocked at the required instants by the register 510;

The inserting, at the input of the system 40 and in the secondary adders and main adders, of the signals contained in the buffer memories;

The transfer by one place of all the signals contained in the chain;

And the erasing of the "1" contained in the register 510.

Therefore, every 1/Fe, as in the case of the device in FIG. 1, a chain of P sum signals each corresponding to a channel is obtained at the output of the chain. The maximum signal indicates the channel to which the true direction of propagation of the wave comes closest.

Figure 4:
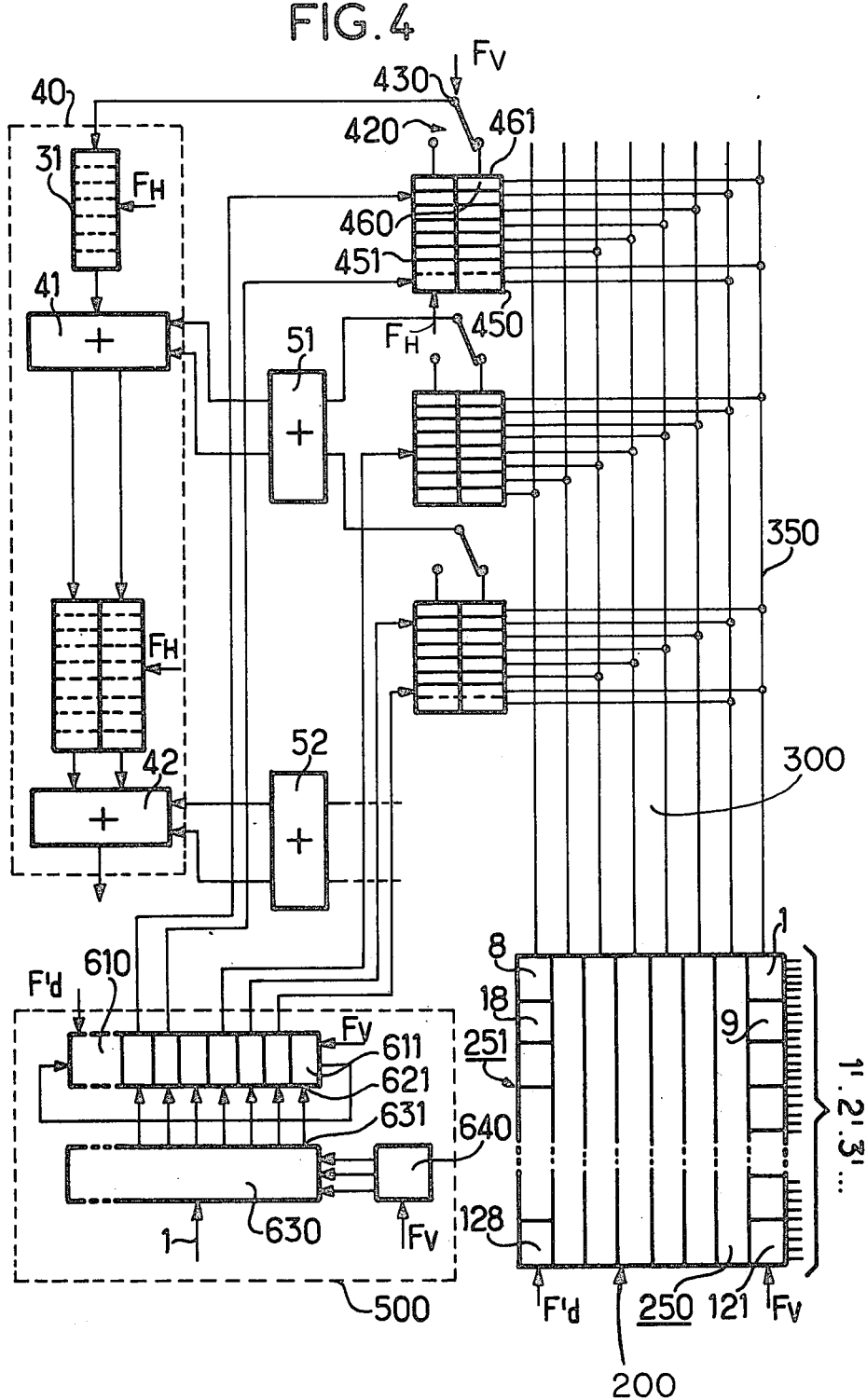
FIG. 4 shows a second variant of the device for forming channels according to the invention.

The device for forming channels in FIG. 4 represents a second embodiment of the invention.

That device comprises the same means as the devices in FIG. 1, except for the means for distributing the data on the chain 40. It comprises a sequence of N detectors 1, 2, 3 . . . evenly spaced out round a circle each followed by a binary coder 1', 2', 3' . . . (not shown). It comprises a chain 40 constituted by an alternate sequence of (N − 1) delay devices 31 . . . and by (N − 1) adders 41, . . . as well as N−1 secondary adders 51, 52, . . .

The distributing means comprise k input shift registers 250 (k being a submultiple of H) arranged in parallel. Each register 250 comprises H/k stages 251.

Each stage 251 of the registers is connected to a coder so that the 1st stage of the 1st register be connected to the coder associated with the detector 1, the 1st stage of the 2nd register being connected to the coder associated with the detector $k$, the 2nd stage of the 1st register being connected to the coder associated with the detector $k + 1$, the 2nd stage of the $k^{th}$ register being connected to the coder associated with the detector $2k$ and the $i^{th}$ stage of the $j^{th}$ register being connected to the coder associated with the detector $k (i - 1) + j$.

Each shift register 250 is connected at its output to a bus bar 350. There are therefore k parallel bus bars 350.

The device comprises, also, $2N - 1$ pairs 420 of sampling shift register 450, 451, connected up in a push-pull configuration. Each of these registers comprises $k$ stages 460, each stage being connected to one of the bus bars 350 so that each register may register the samples of the signals coming from k successive coders. The output of a pair of shift registers is connected to the input of the system 40, the output of the $(2N - 2)$ other pairs being connected to the inputs of the secondary adders.

The output of each pair 420 is provided with a switch 430.

The controlling of the parallel inputs 461 of the stages 460 of the shift register 450 or 451 when the data circulating on the k bus bars 350 is required to be sampled is effected by control means 500. These control means comprise a shift register 610 called the address register, forming a looped circuit, constituted by $H/k$ stages 611, the parallel inputs 621 of those stages 611 are connected to the $H/k$ outputs 631 of a multiplexer 630 receiving, on its input, the signal 1 distributed from one output to the other at the frequency $Fv = F_H/k$ under the effect of a counter 640 fed by the frequency $Fv$.

The charging of the sampling registers 450, 451 is effected for the majority of the registers in two phases.

At an instant $\alpha$, the $k - h$ first stages of the register 450 are charged and at the instant $\alpha + 1$, the $h$ other stages are charged; $h$ can assume a value ranging from 0 to $k - 1$. The value is zero when the first signal to be inserted in an adder comes from a coder associated with a detector whose order is in the form $qk + 1$ ($q$ being a positive integer greater than zero). The address for the sampling registers charged in a single phase, as well as the couples of addresses $\alpha$, $\alpha + 1$, for the registers charged in two phases, are supplied by the outputs of the address register 610.

The operation of the device in FIG. 4 is as follows:

The $k$ input shift registers 250 are charged at the frequency $Fv = F_H/k$, this being enabled by the resetting in coincidence characteristics imposed, for example $Fv > 36 F_S$.

These $k$ registers are emptied at the frequency $Fv$; the stages of those $k$ registers are therefore emptied at the frequency $Fd = Fv \times H/k$ and the signals circulate on the $k$ bus bars at the frequency $F'd$.

In other words, every $1/Fv$, the $H/k$ signals recorded in each of the input registers circulate on the associated bus bar and every $k/(H \times Fv)$, $k$ signals circulate in parallel on the $k$ bus bars, firstly the signals from 1 to $k$, then from $k + 1$ to $2 k$ and so on.

The sampling of the k signals intended to fill each sampling register is effected at two consecutuve instants $\alpha$ and $\alpha+$ 1 for the $h$ first ($h < k$) and for the $k - h$ last. The pulses corresponding to those two instants are supplied by two consecutive outputs of the address register whose stages are controlled at the frequency $Fd = Fv \cdot H/k$.

After a period of $1/Fv$, the 2N-1 sampling registers 450 are filled.

During the following period $1/Fv$, the $2N - 1$ sampling registers 451 will be filled at instants ($\alpha + 1, \alpha + 2$) whereas the registers 450 will discharge into the chain at the frequency $F_H$.

The shifting of the addresses by 1 every $1/Fv$ is obtained by the address register.

A clock 100 supplies the frequency $Fd = H/k \cdot Fv$ as well as the frequencies $Fv$ and $F_H$.

At the frequencies $F_H$, the data coming from the sampling registers are applied to the input of the chain 40 and to the inputs of the secondary adders. Taking a secondary adder whose order is $q$, that is, whose output is connected to the lateral input of the main adder whose order is $q$, its first input receives, in a first period $1/Fv$, the data coming from the coders $ik + j$ to $(i + 1) k + j - 1$, then in a second period $1/Fv$, the data coming from the coders $(i + 1) k + j$ to $(i + 2) k + j - 1$ and so on, until all the data coming from the coders be applied. The last data applied will be that of the coders $(i - 1) k + j$ to $ik + j - 1$.

The second input of the secondary adder whose order is $q$ receives the data of the coders shifted by $2q$ in relation to the coders applied to the first input.

Figure 5:
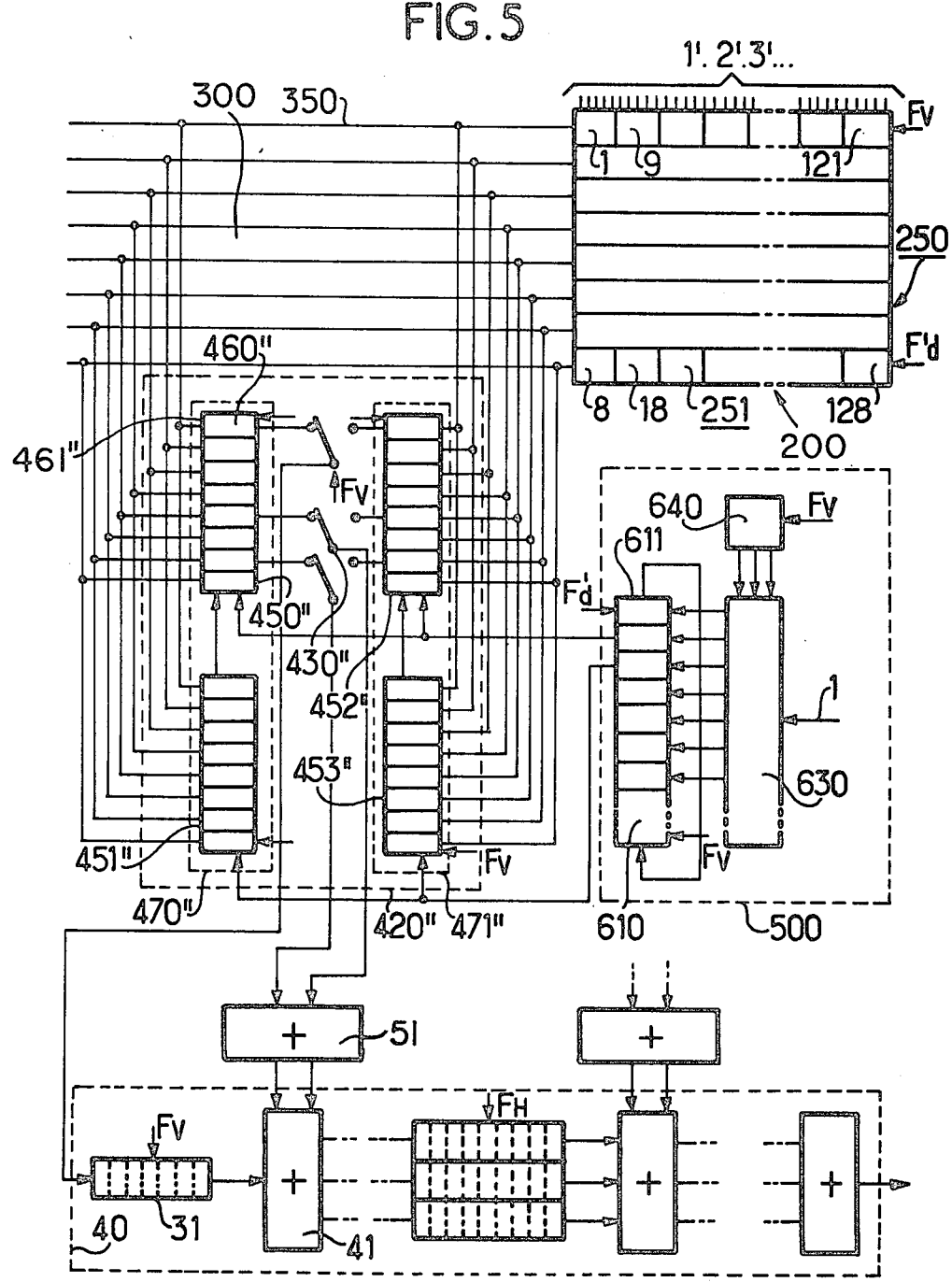
FIG. 5 shows a third variant of the device for forming channels according to the invention.

The device for forming channels shown in FIG. 5 is a particular advantage when the frequency $Fd = H \cdot F_H$ is high and when the number $2N - 1$ of detectors chosen for forming a channel is greater than $H/k$.

The device in FIG. 5 comprises the same elements as the device in FIG. 4 with the exception of the pairs 420 of registers 450, 451, which have been replaced by $H/k$ groups 420'' of 4 sampling shift registers 450'', 451'', 452'', 453''.

Each of the registers 450'', 451'', 452'', 453'' comprises $k$ stages 460''. The registers 450'' and 451'' are connected in series and form a first pair 470'' and the registers 452'' and 453'' are connected in series and form a second pair 471''. The inputs of the first stage of each sampling register 450'', 451'', 452'', 453'' are connected to the first bus bar which is itself connected to the output of the first input register 250. Likewise, the inputs 461' of the $i^{th}$ stage 460' of each sampling register 450', 451', 452', 453' are connected to the $i^{th}$ bus bar 350.

FIG. 5 shows only a few delay devices 31 and main adders 41 of the system 40 with the associated secondary adders 51 as well as only one group 420''.

The 2 pairs 470'', 471'' of each group 420'' are connected up in a push-pull configuration, that is, while one registers, the other discharges.

The parallel output of the stage whose order is h of the first register 450'' of a pair 470'' of a group 420'' as well as the parallel output of the stage whose order is $h$ of the first register 452'' of the other pair 471'' of the same group 420'' are connected to the 2 inputs of a switch 430'' having two positions associated with an input of a secondary adder 51.

That switch 430'' switches at the frequency $Fv$.

Each input of each secondary adder 51 as well as the input of the system 40 is associated with such a switch. There are therefore at the most $2N - 1$ switches 430'', certain switches possibly being common to the input of the system 40 and to the inputs of the secondary adders 51.

The switches 430'' are therefore connected to the parallel outputs of the stages having the same order of the first registers of each pair within the same group. Due to each switch, k samples coming from k successive coders can be applied at the frequency $F_H$ every $1/Fv$.

The control means 500 of the device in FIG. 5 are identical to those of the device in FIG. 4.

The address register 610 comprises H/k stages 611 and the output of a stage 611 is used for unblocking the parallel inputs of the first registers 450", 452" of a determined group 420". The output of the following stage is used for unblocking the parallel inputs of the second registers 451", 453" of the same group 420".

The operation of the device in FIG. 5 is identical to that in FIG. 4.

The k input shift registers 250 are charged at the frequency $Fv = F_H/k$.

These k registers are emptied at the frequency $Fv$ and the signals circulate on the k bus bars at the frequency $Fd = Fv \times H/k$.

Hence, every $1/Fv$, the H/k signals registered in each of the registers circulate on the associated bus bar and every $1/F'd'k$ signals circulate in parallel on the k bus bars, firstly the signals from 1 to k, then those from $k + 1$ to $2k$ and so on.

The sampling of the k signals intended to fill each pair of sampling registers is effected at two instants $\alpha$ and $\alpha + 1$ which are consecutive for the first register (450", 452") and for the second register (451", 453"). The pulses corresponding to those two instants are supplied by two consecutive outputs of the address register. After $1/Fv$, the H/k pairs 470" of sampling registers are filled.

During the following period $1/Fv$, the H/k pairs 471" of sampling registers will be filled at instants ($\alpha + 1, \alpha + 2$) whereas k stages of the pair 470" will discharge in the system at the frequency $F_H$.

The shifting of the addresses by 1 every $1/Fv$ is obtained by the address register.

A clock 100 (not shown) supplies the frequency $F'd$, as well as the frequencies $Fv$ and $F_H$.

At the frequency $F_H$, the data coming from the sampling registers is applied to the input of the chain 40 and to the inputs of the secondary adders. If a secondary adder whose order is q is considered, its first input receives in a first period $1/Fv$ the data coming from the coders $ik + j$ to $(i + 1)k + j - 1$, then in a second period $1/Fv$, the data coming from the coders $(i + 1)k + j$ to $(i + 2)k + j - 1$; and so on until all the data coming from the coders has been applied. The last data applied will be that of the coders $(i - 1)k + j$ to $ik + j - 1$.

The second input of the secondary adder whose order is q receives the data from the coders shifted by 2q in relation to the coders applied to the first input.

In the device according to FIG. 5, certain groups 420" can be omitted when they are not used for supplying the chain 40. This device has, in relation to the device in FIG. 4, the advantage not only of reducing the number of sampling registers when $2N-1$ is very great, but also of requiring sampling registers which are simply built all of whose parallel inputs are triggered at the same time.

In an example of embodiment in a sonar, a circular base of $H = 128$ hydrophones spaces out round 360° is used and it is required to form 128 channels, each channel comprising $2N-1 = 39$ hydrophones.

The forming frequency for the 128 channels is $Fe = 25$ kc/s. $k = 8$ parallel bus bars are used. The frequency $Fv$ for the resetting in coherence is therefore $(25 \times 128)/8 = 400$ kc/s and $F_H$, which is the frequency at which the data circulates along the system, is $H \cdot Fe = 3.2$ Kc/s, each of the 8 shift registers 250 comprising 16 stages and the sampling registers each comprising 8 stages.

The chain 40 comprises 19 main adders and is associated with 19 secondary adders and the address register comprises 16 stages. The multiplexer is controlled at the frequency $Fv$. 16 couples of addresses $\alpha$ and $\alpha + 1$ are determined by the outputs of the address register.

Figure 6:
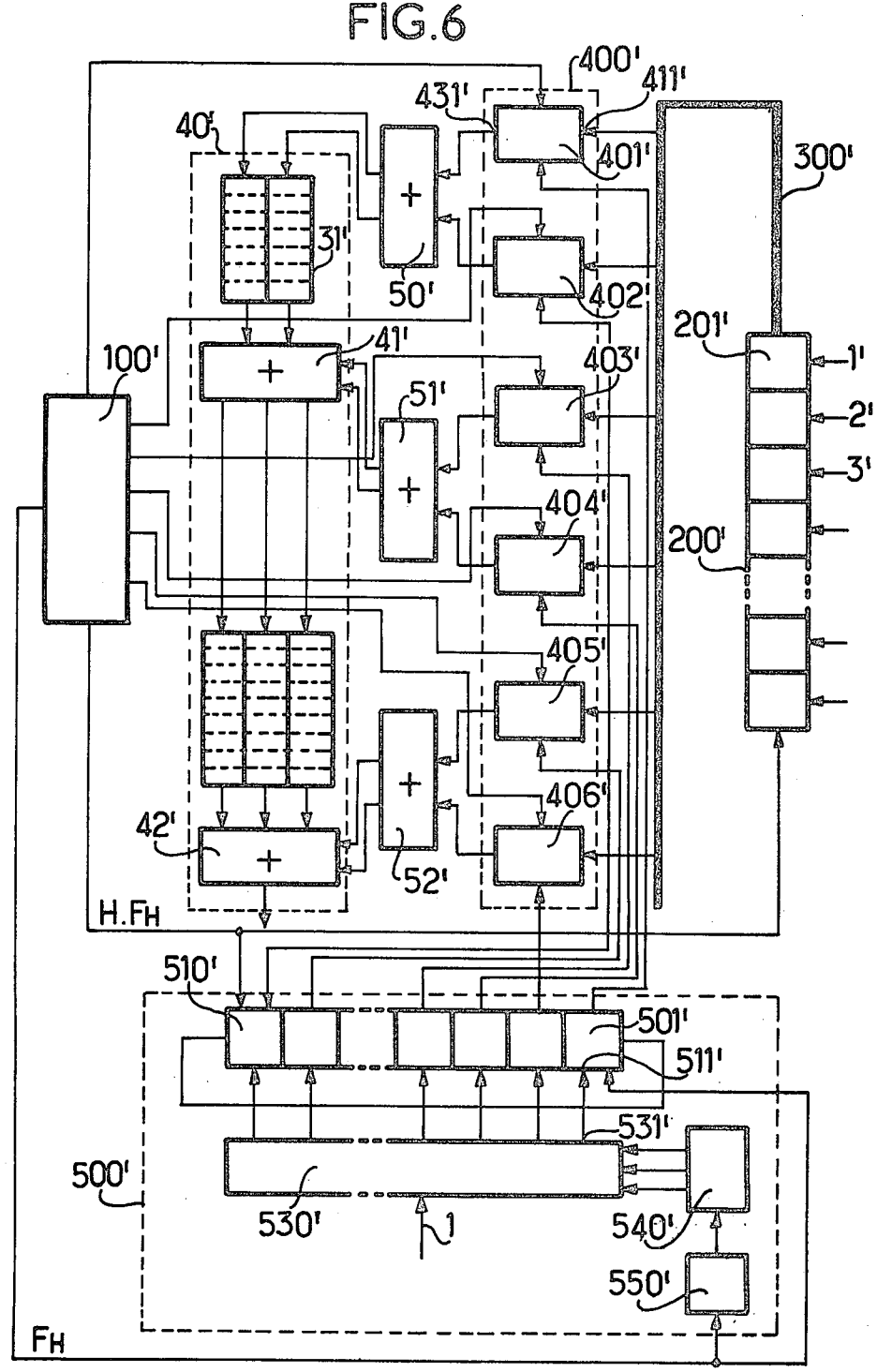
FIG. 6 shows a fourth variant of the device for forming channels according to the invention.

FIG. 6 shows a fourth variant of embodiment of the device for forming channels according to the invention.

That device comprises the same elements as the known device in FIG. 2, except for the distributing means 20. It comprises a sequence of H detectors 1 ... (not shown) arranged evenly in a circle followed by coders 1' ... (not shown), a chain 40' constituted by an alternate sequence of $N - 1$ delay devices 31', ... and of $N - 1$ main adders 41', ... as well as N secondary adders 50', 51', 52', ...

The distributing means comprise a shift register 200' constituted by H stages 201'.

Each stage 201' comprises a parallel input connected to the output of a coder 1'. ...

The output of the register 200' is connected to a bus bar 300'.

The shift register is emptied at the frequency $F_H$.

Thus, every $1F_H$, all the signals coming from the H coders circulate on the bus bar 300'.

The device comprises means 400' for sampling the signals on the bus bar 300'.

These sampling means are constituted by 2N buffer memories 401', 402', 403', 404', 405', 406', whose feed inputs 411' are connected to the bus bar 300'.

The outputs 431' of the memories 401' are connected to the inputs of the secondary adders 50', 51', 52'.

Each buffer memory such as 401' comprises also a control input 421', which is used for unblocking the feed input of the buffer memory in order that the signal which circulates on the bus bar at the moment when the control input is energized by sampled by the buffer memory.

2N samplings must therefore be made every $1/F_H$.

The samplings are taken at instants $X + \alpha_1$ for the memory 401', $X + \alpha_2$ for the memory 402', $X + \alpha_3$ for the memory 403', $X + \alpha_4$ for the memory 404', $X + \alpha_5$ for the memory 405' and $X + \alpha_6$ for the memory 406'.

X is an invariable integer from 1 to P increasing by increments of 1 every $1/F_H$, P being the number of channels formed.

When the sampling instant of the first buffer memory 401' whose output is connected to the first input of the first secondary adder 50, is $X + \alpha_1$, the sampling instant of the second buffer memory 402' whose output is connected to the second input of the first secondary adder is $X + \alpha_1 - 1$.

The sampling instant of the third buffer memory 403' whose output is connected to the first input of the second secondary adder 51' is:

$$X + \alpha_1 + 1 - \{(P - n_1)\}$$

and the sampling instant of the fourth buffer memory 404' whose output is connected to the second input of the second secondary adder 51' is:

$$X + \alpha_1 - 2 - \{(P - n_1)\}$$

$n_1$ being the number of elementary cells of the delay device 31.

Each shift register 250' is connected at its output to a bus bar 350'. There are therefore k parallel bus bars 350'.

The device comprises, also, 2N pairs 420' of sampling shift registers 450', 451', connected up in a push-pull configuration. Each of these registers comprises k stages 460', each stages being connected to one of the bus bars 350' so that each register may register the samples of the signals coming from k successive coders. The outputs of the 2N pairs of shift registers are connected to the inputs of the secondary adders.

The output of each pair 420' is provided with a switch 430'.

The controlling of the parallel inputs 461' of the stages 460' of the shift register 450' or 451' when the data circulating on the k bus bars 350' is required to be sampled is effected by control means 500'. These control means comprise a shift register 610' called the address register, forming a looped circuit constituted by H/k stages 611', the parallel inputs 621' of those stages 611' are connected to the H/k outputs 631' of a multiplexer 630' receiving, on its input, the signal 1 distributed from one output to the other at the frequency $Fv = F_H/k$ under the effect of a counter 640' fed by the frequency $Fv$.

The charging of the sampling registers 450', 451' is effected for the majority of the registers in two phases.

At an instant $\alpha$, the k-h first stages of the register 450' are charged and at the instant $\alpha + 1$, the h other stages are charged; h can assume a value ranging from 0 to $k - 1$. The value is zero when the first signal to be inserted in an adder comes from a coder associated with a detector whose order is in the form $qk + 1$ (q being a positive integer greater than zero). The address for the sampling registers charged in a single phase, as well as the couples of addresses $\alpha$, $\alpha + 1$, for the registers charged in two phases are supplied by the outputs of the address register 610'.

Figure 7:
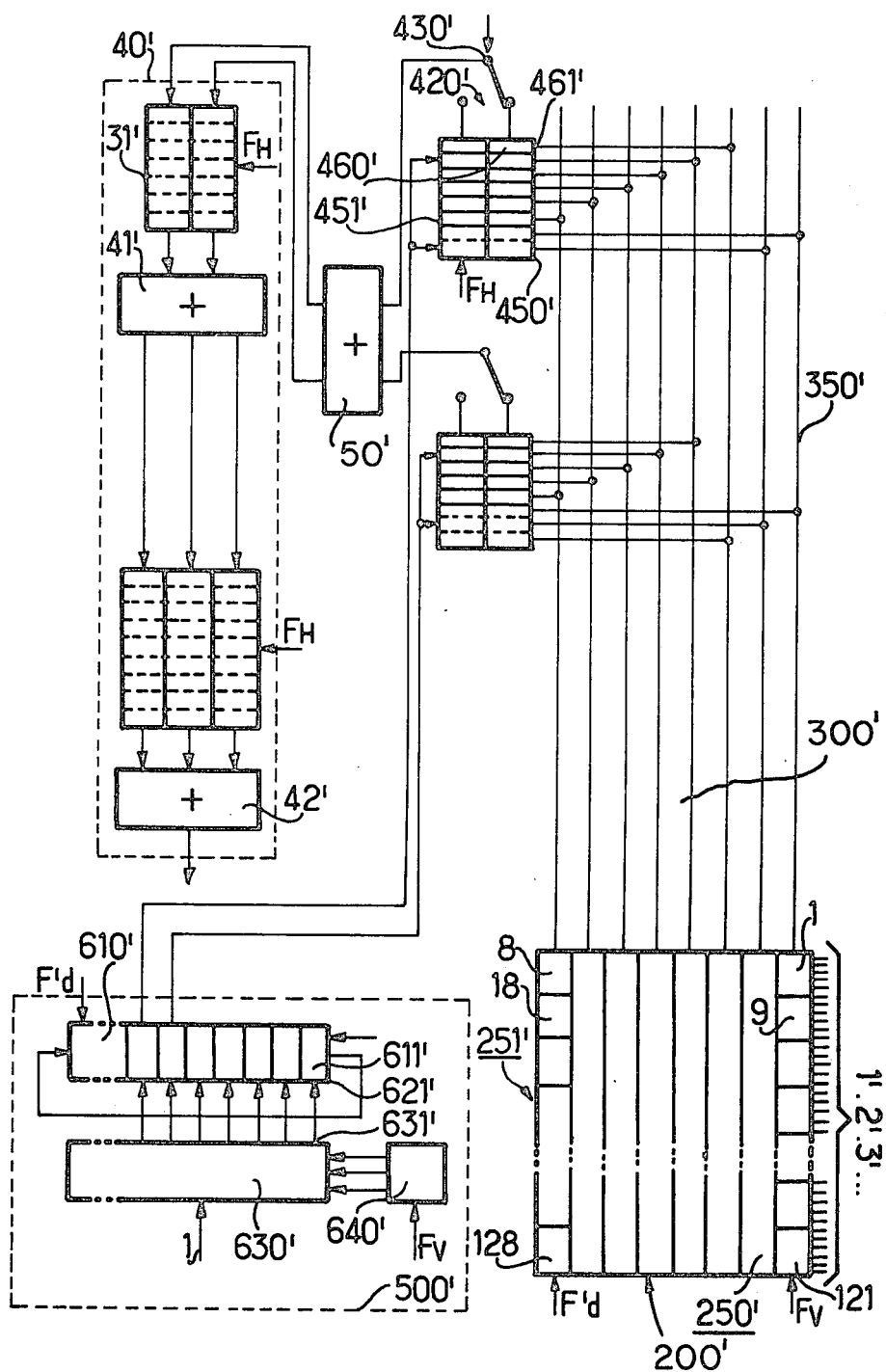
FIG. 7 shows a fifth variant of the device for forming channels according to the invention.

The operation of the device in FIG. 7 is as follows:

The k input shift registers 250' are charged at the frequency $Fv = F_H/k$, this being enabled by the resetting in coincidence characteristics imposed, for example $Fv > 36 F_S$.

These k registers are emptied at the frequency $Fv$, the stages of those k registers are therefore emptied at the frequency $Fv$, the stages of those k registers are therefore emptied at the frequency $F'd = Fv \times H/k$ and the signals circulate on the k bus bars at the frequency $F'd$.

In other words, every $1/Fv$, the H/k signals recorded in each of the input registers circulate on the associated bus bar and every $k/(HxFv)$, k signals circulate in parallel on the k bus bars, firstly the signals from 1 to k, then from $k + 1$ to $2k$ and so on.

The sampling of the k signals intended to fill each sampling register is effected at two consecutive instants $\alpha$ and $\alpha + 1$ for the h first ($h < k$) and for the $k - h$ last. The pulses corresponding to those two instants are supplied by two consecutive outputs of the address register whose stages are controlled at the frequency $Fd = Fv \cdot H/k$.

After a period of $1/Fv$, the 2N samplings registers 450' are filled.

During the following period $1/Fv$, the 2N sampling registers 451' will be filled at instants ($\alpha + 1$, $\alpha + 2$) whereas the registers 450' will discharge into the system at the frequency $F_H$.

The shifting of the addresses by 1 every $1/Fv$ is obtained by the address register.

A clock 100' (not shown) supplies the frequency $F'd = H/k \cdot Fv$ as well as the frequencies $Fv$ and $F_H$.

At the frequency $F_H$, the data coming from the sampling registers are applied to the inputs of the secondary adders. Taking a secondary adder whose order is q, its first input receives, in a first period $1/Fv$, the data coming from the coders $ik + j$ to $(i + 1) k + j - 1$, then in a second period $1/Fv$, the data coming from the coders $(i + 1) k + j$ to $(i + 2) k + j - 1$ and so on, until all the data coming from the coders be applied. The last data applied will be that of the coders $(i - 1) k + j$ to $ik + j - 1$ The second input of the secondary adder whose order is q receives the data of the coders shifted by $2q - 1$ in relation to the coders applied to the first input.

Figure 8:
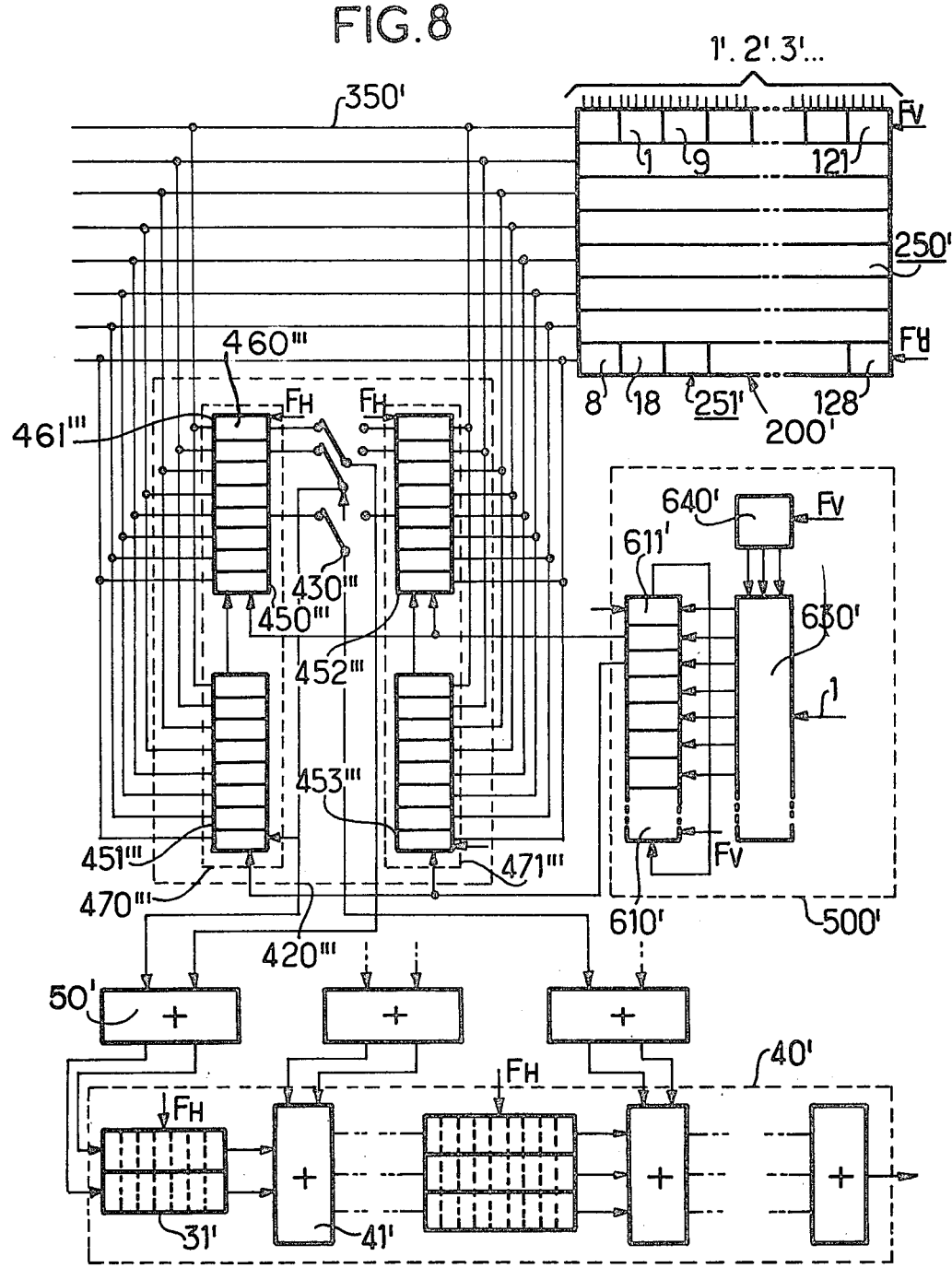
FIG. 8 shows a sixth variant of the device for forming channels according to the invention.

The device for forming channels shown in FIG. 8 is a particular advantage when the frequency $Fd = H \cdot F_H$ is high and when the number 2N of detectors chosen for forming a channel is greater than H/k.

The device in FIG. 8 comprises the same elements as the device in FIG. 7 with the exception of the pairs 420' of registers 450', 451', which have been replaced by H/k groups 420''' of 4 sampling shift registers 450''', 451''', 452''', 453'''.

Each of the registers 450''', 451''', 452''', 453''' comprises k stages 460'''. The registers 450''' and 451''' are connected in series and form a first pair 470''' and the registers 452''' and 453''' are connected in series and form a second pair 471'''. The inputs of the first stage of each sampling register 450''', 451''', 452''', 453''' are connected to the first bus bar which is itself connected to the output of the first input register 250'. Likewise, the inputs 461''' of the $i^{th}$ stage 460''' of each sampling register 450''', 451''', 452''', 453''' are connected to the $i^{th}$ bus bar 350'.

FIG. 8 shows only a few delay devices 31' and main adders 41' of the chain 40' with the associated secondary adders 50' as well as only one group 420'''.

The 2 pairs 470''', 471''' of each group 420''' are connected up in a push-pull configuration, that is, while one registers, the other discharges.

The parallel output of the stage whose order is h of the first register 450''' of a pair 470''' of a group 420''' as well as the parallel output of the stage whose order is h of the first register 452''' of the other pair 471''' of the same group 420''' are connected to the 2 inputs of a switch 430''' having 2 positions associated with an input of a secondary adder 50'.

That switch 430''' switches at the frequency $Fv$.

Each input of each secondary adder 50' is associated with such a switch. There are therefore at the most 2N switches 430''', certain switches possibly being common to several inputs of the secondary adders 50'.

The switches 430''' are therefore connected to the parallel outputs of the stages having the same order of the first registers of each pair within the same group. Due to each switch, k samples coming from k successive coders can be applied at the frequency $F_H$ every $1/Fv$.

The control means 500' of the device in FIG. 8 are identical to those of the device in FIG. 7.

The address register 610' comprises H/k stages 611' and the output of a stage 611' is used for unblocking the parallel inputs of the first registers 450''', 452''' of a determined group 420'''. The output of the following stage is used for unblocking the parallel inputs of the second registers 451''', 453''' of the same group 420'''.

(P − $n_1$) represents the order number of the channel available in front of the first secondary adder when the channel 1 is available before the first secondary adder.

The sampling instant of the $(2q-1)^{th}$ buffer memory whose output is connected to the first input of the $q^{th}$ secondary adder is $$X + a_1 + q - 1 - \left\{ \sum_{1}^{q-1} (P - n_i) \right\}$$

and the sampling instant of the $2q^{th}$ buffer memory whose output is connected to the second input of the $q^{th}$ secondary adder is $$X + a_1 - q - \left\{ \sum_{1}^{q-1} (P - n_i) \right\}$$

$n_i$ being the number of elementary cells composing the delay device comprised between the $(i − 1)^{th}$ and the $i^{th}$ and the $i^{th}$ main adder.

It follows that the sampling instants of the 2 buffer memories associated with the $q^{th}$ secondary adder differ from $2q − 1$.

It should be observed that the expressions whose form is $$\left\{ \sum_{1}^{q-1} (P - n_i) \right\}$$

are calculated modulo P so as to be positive and less than P.

The sampling instants are determined by control means 500'.

The control means 500' comprise an address register 510' forming a looped circuit and comprising H stages 501'. Each stages comprises an input 511' and an output 521' which are parallel.

The parallel inputs 511' are connected to the outputs 531' of a multiplexer 530'. That multiplexer is fed by a unit signal and is controlled by a counter 540' which, every $1/F_H$, unblocks a multiplexer output. The unblocked output in the output next to that unblocked a time $1/F_H$ before.

Thus, every $1/F_H$, a stage of the shift register 510' is charged with the unit signal.

If it is required to constitute P channels every $1/Fe$ (Fe being chosen so as to be greater than $2F_S$), each being associated with a group of 2N detectors, P successive samplings must be effected every $1/Fe$ with the 2N buffer memories. The outputs of 2N stages of the address register 510' are connected to the control inputs of the 2N buffer memories. When the unit signal turns in the register 510' with the frequency $Fd = H \times F_H$, the 2N stages each supply a pulse at the instants $X + a_1$, $X + a_2$, $X + a_3$, $X + a_4$, $X + a_5$, $X + a_6$.

For that purpose, those 2N stages must be suitably chosen taking into account the formulas established for $a_1, a_2, a_3, a_4, a_5, a_6$, At the following period $1/F_H$, by means of the multiplexer 530', a new unit signal is brought into a stage of the register 510' shifted by one place backward in relation to the stage in which the signal 1 had been brought in previously. Due to that arrangement, all the X's can be shifted by 1 at each period $1/F_H$.

The counter 540' is piloted by the frequency $F_H$ and is reset to zero every p pulse. It is possible to shift the signal 1 by p stages of the register 510' every $1/F_H$, this making it possible to form the channels $Vi$, $Vi+p$, $Vi+2p$. To do this, all that is necessary is to feed the counter 540' with this frequency $pF_H$, it being possible to do this by means of an adjustable frequency multiplier 550', fed with the frequency $F_H$.

The clock 100' supplies a pilot signal whose frequency is $F_H$ and a pilot signal whose frequency is $Fd = H \cdot F_H$. The frequency $F_H$ can be obtained by division of the frequency $Fd$. The frequency $F_H$ pilots the filling of the register 200' by the H coders, the reading and the resetting to zero of the 2N buffer memories, the advancing of a cell of a delay device for the data contained in the chain 40', the resetting to zero of the register 510' and its filling by the multiplexer 530'.

The frequency $Fd = H \cdot F_H$ pilots the reading of the data contained in the register 200' as well as the circulating of the signal 1 in the register 510'.

During a period $1/F_H$, the operations are effected in the following order:

Filling of the register 200';
The bringing in of a "1" into the register 510';
The circulating of the data contained in the register 200' on the bar 300' at the frequency $H \cdot F_H$;
The circulating of the "1" at the frequency $H \cdot F_H$ in the register 510' in synchronism;
Sampling of the data circulating on the bar 300' by the buffer memories unblocked at the required instants by the register 510';
The inserting in the secondary adders and main adders, of the signals contained in the buffer memories;
The transfer by one place of all the signals contained in the chain;
And the erasing of the "1" contained in the register 510'.

Therefore, every $1/Fe$, as in the case of the device in FIG. 1, a chain of P sum signals each corresponding to a channel is obtained at the output of the chain. The maximum signal indicates the channel to which the true direction of propagation of the wave comes closest.

The device for forming channels in FIG. 7 represents a fifth embodiment of the invention.

That device comprises the same means as the device in FIG. 6, except for the means for distributing the data on the system 40'. It comprises a sequence of H detectors 1, 2, 3 . . . evenly spaced out round a circle each followed by a binary coder 1', 2', 3', . . . (not shown). It comprises a chain 40' constituted by an alternate sequence of (N − 1) delay devices 31' . . . and of (N − 1) adders 41', . . . as well as N secondary adders 50', 51' . . .

The distributing means comprise k input shift registers 250' (k being a submultiple of H) arranged in parallel. Each register 250' comprises H/k stages 251'.

Each stage 251' of the register be connected to the coder so that the 1st stage of the 1register be connected to the coder associated with the detector 1, the 1st stage of the 2nd register being connected to the coder associated with the detector 2, the 1st stage of the $k^{th}$ register being connected to the coder associated with the detector $k$, the 2nd stage of the 1st register being connected to the coder associated with the detector $k + 1$, the 2nd stage of the $k^{th}$ register being connected to the coder associated with the detector $2k$ and the $i^{th}$ stage of the $j^{th}$ register being connected to the coder associated with the detector $k(i − 1) + j$.

The operation of the device in FIG. 8 in identical to that in FIG. 7.

The k input shift registers 250' are charged at the frequency $Fv = F_H/k$.

These k registers are emptied at the frequency Fv and the signals circulate on the k bus bars at the frequency $F'd = Fv \times H/k$. Hence, every 1/Fv, the H/k signals registered in each of the registers circulate on the associated bus bar and every 1/F'd, k signals circulate in parallel on the k bus bars, firstly the signals from 1 to k, then those from $k + 1$ to 2 k and so on.

The sampling of the k signals intended to fill each pair of sampling registers is effected at two instants α and α + 1 which are consecutive for the first register (450''', 452''') and for the second register (451''', 453'''). The pulses corresponding to those two instants are supplied by two consecutive outputs of the address register. After 1/Fv, the H/k pairs 470''' of sampling registers are filled.

During the following period 1/Fv, the H/k pairs 471''' of sampling registers will be filled at instants (α + 1, α + 2) whereas k stages of the pair 470''' will discharge in the system at the frequency $F_H$.

The shifting of the addresses by 1 every 1/Fv is obtained by the address register.

A clock 100' (not shown) supplies the frequency F'd, as well as the frequencies Fv and $F_H$.

At the frequency $F_H$, the data coming from the sampling registers is applied to the inputs of the secondary adders. If a secondary adder whose order is q is considered, its first input receives in a first period 1/Fv the data coming from the coders $ik + j$ to $(i + 1) k + j - 1$, then in a second period 1/Fv, the data coming from the coders $(i + 1) k + j$ to $(i + 2) k + j - 1$; and so on until all the data coming from the coders has been applied. The last data applied will be that of the coders $(i - 1) k + j$ to $ik + j - 1$.

The second input of the secondary adder whose order is q receives the data from the coders shifted by 2q in relation to the coders applied to the first input.

In the device according to FIG. 8, certain groups 420''' can be omitted when they are not used for supplying the chain 40'. This device has, in relation to the device in FIG. 7, the advantage not only of reducing the number of sampling registers when 2N is very great, but also of requiring sampling registers which are simply built all of whose parallel inputs are triggered at the same time.

In an example of embodiment in a sonar, a circular base of H = 128 hydrophones spaced out round 360° is used and it is required to form 128 channels with 2N = 40 hydrophones.

The forming frequency for the 128 channels is Fe = 25 k/Hz.

k = 8 parallel bus bars are used. The frequency Fv for the resetting in coherence is therefore (25 = 128)/8 = 400 Kc/s and $F_H$, which is the frequency at which the data circulates along the system, is $H.Fe = 3.2$ Kc/s, each of the 8 shift registers 250 comprising 16 stages and the sampling registers each comprising 8 stages.

The devices in FIGS. 3 to 8 could be produced with coders coding the signals coming from the detectors not in pure binary code, but in digital code having s bits. The s bits would be processed in parallel and it would therefore be necessary, while maintaining a similar system, to have available s memorizing means and s times as many bus bars, as well as s times as many sampling means as in the devices in FIGS. 3 to 8.

Although the devices for forming channels which have just been described may appear to provide the greatest advantages for implementing the invention, it will be understood that various modifications can be made thereto without going beyond the scope of the invention, it being possible to replace certain of those elements by other elements capable of fulfilling the same technical function or an equivalent technical function therein.

I claim:

1. Device for forming channels comprising H detectors evenly spaced along an arc of a circular base:
   H coders, each coder being connected to the output of a detector for transcoding the analog output signal of the detector into a signal having s bits ($s \geq 1$),
   Means (200) for sampling and memorizing the signals coming from the H coders,
   A bus bar system (300) on which the signals memorized as a whole pass,
   Means (400) for sampling at the frequency $F_H$ the signals on the bus bar system (300),
   Control means (500) for the sampling means (400),
   (N−1) secondary adders (51, 52), the inputs of which are fed by the sampling means (400),
   A chain (40) constituted by an alternate sequence of (N−1) delay devices (31, 32) and of (N−1) main adders (41, 42), where (2N−1 < H), each main adder (41, 42) comprising an input (A) connected to the output of a delay device (31, 32) and a lateral input (B) connected to the output of a secondary adder (51, 52), each delay device (31, 32) comprising at least an elementary cell, the chain input being fed by said sampling means (400), and
   A clock (100) delivering a frequency $F_H$ to the control means and to the chain (40) for controlling the transfer of the signals along the chain (40) so that the signals stay only during a period 1/$F_H$ in an elementary cell.

2. Device for forming channels according to claim 1, characterized in that the H coders (1',2', . . . ) code the signals in pure binary code.

3. Device for forming channels to claim 2, characterized in that the said sampling and memorizing means comprise a shift register (200) constituted by H stages (201), each stage (201) being fed by a coder (1', 2', . . . ), the said shift register (200) being filled at the frequency $F_H$, the output of the shift register (200) being connected to the bus bar system (300) comprising only one bar, the said shift register (200) being emptied at the frequency $F_H$ and in that the said sampling means (400) comprise (2N−1) buffer memories (401, 402, 403, 404, 405) comprising a feed input (411) of a control input (421) unblocking the feed input (411) when it is energized and an output (431), the feed input (411) of each buffer memory (401, 402, 403, 404, 405) being connected to the bus bar (300), the output (431) of one of the memories (401) being connected to the input of the chain (40) and the output (431) of each of the 2N−2 other memories (402, 403, 404, 405) being connected to one of the inputs of one of the (N−1) secondary adders (51, 52), the said control inputs (421) being connected to the said control means (500) which supply on each of the control inputs (421) one signal every 1/$F_H$, the buffer memories (401, 402, 403, 404) being emptied in the system (40) at the frequency $F_H$.

4. Device for forming channels according to claim 3, characterized in that the control means (500) for the sampling means (400) comprise a shift register (510) having H stages (501), forming a looped circuit, each stage (501) comprising an input (511) and an output (521) which are parallel, 2N−1 of those parallel outputs (521) being connected to the control inputs (421) of the 2N−1 buffer memories, (401, 402, 403, 404, 405), the parallel inputs (511) of the said register (501) being connected to the H outputs (531) of a multiplexer (530) fed by a unit signal distributed sequentially every $1/F_H$ from an output to an output spaced apart by a distance $p$ ($p \geq 1$) by a counter (540) controlled by the clock (100), the said shift register (510) being charged by the multiplexer (530) every $1/F_H$ and the circulating of the unit signal in the H stages (501) being effected at the frequency $Fd = HF_H$.

5. Device for forming channels according to claim 4, characterized in that the counter (540) is provided with means making it possible to make the number $p$ of outputs jumped vary.

6. Device for forming channels according to claim 2, characterized in that the sampling and memorizing means (200) comprise $k$ input shift registers (250), $k$ being a sub-multiple of H, each input register (250) comprising H/$k$ stages (251), each stage (251) being fed by a coder (1', 2', ...), the said input shift registers (251) being filled at a frequency $Fv = F_H/k$ and read 1/Fv, the outputs of the said shift registers (250) being connected to a bus bar system (300) comprising $k$ bars (350) in parallel, each of them being connected to the output of a shift register (251) and in that the sampling means (400) comprise 2N−1 pairs (420) of sampling shift registers (450, 451) constituted by $k$ stages (460) each, each pair of registers comprising a register (450) which registers when the other (451) discharges, the parallel input (461) of each stage (460) being connected to a bus bar (350), the output of one of the pairs (420) of registers being connected to the input of the chain (40), the outputs of the other pairs (420) being connected to the inputs of the (N−1) secondary adders (51, 52) of the chain (40), the unblocking of the parallel inputs (461) of the sampling registers (450, 451) being effected by control means (500), the stages (460) of the sampling registers (450, 451) being emptied at the frequency $F_H$.

7. Device for forming channels according to claim 6, characterized in that the said control means (500) comprise an address register (610) forming a looped circuit and constituted by H/$k$ stages (611) whose parallel inputs (621) are connected to the outputs of a multiplexer (630) having H/$k$ outputs (631), the said multiplexer (530) being fed by a unit signal distributed sequentially at the frequency Fv from an output of the multiplexer (620) to the following output, the said address register (610) being charged by the said multiplexer every 1/Fv, the circulating of the unit signal in the H/$k$ stages (611) of the address register (610) being effected at the frequency $Fd = H/k \cdot Fv$, the signals obtained on the parallel outputs (621) of the H/$k$ stages (611) being used for unblocking the parallel inputs (461) of the stages (460) of the pairs (420) of sampling registers (450, 451), the unblocking of the $(k−h)$ stages (460) of each register (450, 451) of each pair (420) being controlled by the same stage (611) of the address register (610), the remaining $h$ stages (460) being controlled by the following stage (611) of the address register (610), $h$ being able to assume values ranging from 0 to $k−1$ according to the pair (420) of sampling registers (450, 451) considered.

8. Device for forming channels according to claim 6, characterized in that the said control means (500) comprise an address register (610) forming a looped circuit and constituted by H/$k$ stages (611) whose parallel inputs (621) are connected to the outputs of a multiplexer (630) having H/$k$ outputs (631), the said multiplexer (630) being fed by a unit signal distributed sequentially at the frequency Fv from an output of the multiplexer (620) to the following output, the said address register (610) being charged by the said multiplexer every 1/Fv, the circulating of the unit signal in the H/$k$ stages (611) of the address register (610) being effected at the frequency $Fd = Fv \cdot H/k$, the signals obtained at the parallel outputs (621) of the H/$k$ stages (611) used for unblocking the parallel inputs (461'') of the stages (460'') of the groups (420'') of sampling registers (450'', 451'', 452'', 453''), the unblocking of the $k$ stages (460'') of the first register (450'') of a pair (470'') of a group (420'') being controlled by a stage (611) of the address register (610), the $k$ stages of the second register (451'') of the same pair (470'') being controlled by the following stage (611) of the address register (610).

9. Device for forming channels according to claim 2, characterized in that the sampling and memorizing means (200) comprise $k$ input shift registers (250), $k$ being a sub-multiple of H, each input register (250) comprising H/$k$ stages (251), each stage (251) being fed by a coder, (1', 2', ...) the said input shift registers (251) being filled at a frequency $Fv = F_H/k$ and read every 1/Fv, the outputs of the said shift registers (250) being connected to a bus bar system (300) comprising $k$ bars (350) in parallel, each of them being connected to the output of a shift register (251) and in that the sampling means (400) comprise at the most H/$k$ groups (420'') of 4 sampling shift registers 450'', 451'', 452'', 453''), each group (420'') being constituted by 2 pairs (470'', 471'') of registers and each pair being constituted by a first and a second register in series, each group (420'') comprising a pair (470'') of registers which register when the other (471'') discharges, the parallel input of the $i^{th}$ stage of each register (450'', 451'', 452'', 453'') of each group (420'') being connected to the $i^{th}$ bus bar (350), $i$ assuming all the values from 1 to $k$, the input of the chain (40) as well as each of the inputs of each secondary adder (51) being connected to the output of an associated switch (430'') comprising 2 inputs, one of the inputs of each switch (430'') being connected to the parallel output of one of the $k$ stages of the first register (450'') of one of the pairs (470'') of a determined group (420''), the other input being connected to the parallel output of the stage having the same order of the first register (452'') of the other pair (471'') of the same group (420''), the unblocking of the parallel inputs (461'') of the sampling registers (450'', 451'', 452'', 453'') being effected by control means (500), $k$ consecutive stages of the pairs (470'', 471'') of sampling registers being emptied at the frequency $F_H$.

10. Device for forming channels comprising H detectors evenly spaced along an arc of a circular base:

H coders, each coder being connected to the output of a detector for transcoding the analog output signal of the detector into a signal having $s$ bits ($s \geq 1$), Means (200') for sampling and memorizing the signals coming from the H coders, A bus bar system (300') on which the signals memorized as a whole pass, Means (400') for sampling, at the frequency $F_H$ the signals on the bus bar system (300'), Control means (500') for the sampling means (400'), A chain (40') constituted by an alternate sequence of (N−1) delay device (31', 32') and of (N−1) main adders (41', 42'), where (2N < H), each main adder (41', 42') comprising an input (A) connected to the output of a delay device (31', 32') and a lateral input (B).

N secondary adders (50', 51', 52'), the inputs of which are fed by the sampling means (400'), the output of one of the secondary adders (50') being connected to the input of the chain (40') and the output of the (N−1) others (51', 52') being connected to the lateral input (B) of a main adder (41', 42'), each delay device (31', 32') comprising at least an elementary cell, and A clock (100') delivering a frequency $F_H$ to the control means and to the chain (40') for controlling the transfer of the signals along the chain (40') so that the signals stay only during a period $1/F_H$ in an elementary cell.

11. Device for forming channels according to claim 10, characterized in that the H coders (1', 2', ...) code the signals in pure binary code.

12. Device for forming channels according to claim 11, characterized in that the said sampling and memorizing means comprise a shift register (200') constituted by H stages (201'), each stage (201') being fed by a coder (1', 2', ...), the said shift register (200') being filled at the frequency $F_H$, the output of the shift register (200') being connected to the bus bar system (300') comprising only one bar, the said shift register (200') being emptied at the frequency $F_H$ and in that the said sampling means (400')comprise 2N buffer memories (401', 402', 403', 404', 405', 406') comprising a feed input (411') of a control input (421') unblocking the feed input (411') when it is energized and an output (431'), the feed input (411') of each buffer memory (401', 402', 403', 404', 405', 406') being connected to the bus bar (300'), the output (431) of each of the 2N memories (401', 402', 403', 404', 405', 406')being connected to one of the inputs of one of the N secondary adders (50', 51', 52'), the said control inputs (421') being connected to the said control means (500') which supply on each of the control inputs (421') one signal every $1/F_H$, the buffer memories (401', 402', 403', 404', 405', 406') being emptied in the system (40') at the frequency $F_H$.

13. Device for forming channels according to claim 12, characterized in that the control means (500') for the sampling means (400') comprise a shift register (510') having H stages (501'), forming a looped circuit, each stage (501') comprising an input (511') and an output (521') which are parallel, 2N of those parallel outputs (521') being connected to the control inputs (421') of the 2N buffer memories, (401', 402', 403', 404', 405'),the parallel inputs (511') of the said register (501') being connected to the H outputs (531') of a multiplexer (530') fed by a unit signal distributed sequentially every $1/F_H$ from an output to an output spaced apart by a distance $p$ ($p \geq 1$) by a counter (540') controlled by the clock (100'), the said shift register (510') being charged by the multiplexer (530') every $1/F_H$ and the circulating of the unit signal in the H stages (501') being effected at the frequency $Fd = HF_H$.

14. Device for forming channels according to claim 13, characterized in that the counter (540') is provided with means making it possible to make the number $p$ of outputs jumped vary.

15. Device for forming channels according to claim 11, characterized in that the sampling and memorizing means (200') comprise $k$ input shift registers (250'), $k$ being a sub-multiple of H, each input register (250') comprising H/$k$ stages (251'), each stage (251') being fed by a coder (1', 2', ...) the said input shift registers (250') being filled at a frequency $Fv = F_H/k$ and read every $1/Fv$, the outputs of the said shift registers (250') being connected to a bus bar system (300') comprising $k$ bars (350') in parallel, each of them being connected to the output of a shift register (250') and in that the sampling means (400') comprise 2N pairs (420') of sampling shift registers (450', 451') constituted by $k$ stages (460') each, each pair of registers comprising a register (450') which registers when the other (451') discharges, the parallel input (461') of each stage (460') being connected to a bus bar (350'), the output of one of the pairs (420') of registers being connected to the inputs of the N secondary adders (50', 51', 52'), the unblocking of the parallel inputs (461') of the sampling registers (450', 451') being effected by control means (500'), the stages (460') of the sampling registers (450', 451') being emptied at the frequency $F_H$.

16. Device for forming channels according to claim 15, characterized in that the said control means (500') comprise an address register (610') forming a looped circuit and constituted by H/$k$ stages (611') whose parallel inputs (621') are connected to the outputs of a multiplexer (630') having H/$k$ outputs (631') the said multiplexer (630') being fed by a unit signal distributed sequentially at the frequency $Fv$ from an output of the multiplexer (620') to the following output, the said address register (610') being charged by the said multiplexer every $1/Fv$, the circulating of the unit signal in the H/$k$ stages (611') of the address register (610') being effected at the frequency $F'd = H.Fv/k$, the signals obtained on the parallel outputs (631') of the H/$k$ stages (611') being used for unblocking the parallel inputs (461') of the stages (460') of the pairs (420') of sampling registers (450', 451') the unblocking of the ($k-h$) stages (460') of each register (450', 451') of each pair (420') being controlled by the same stage (611') of the address register (610') the remaining $h$ stages (460') being controlled by the following stage (611') of the address register (610'), $h$ being able to assume values ranging from 0 to $k-1$ according to the pair (420') of sampling registers (450', 451') considered.

17. Device for forming channels according to claim 11, characterized in that the sampling and memorizing means (200') comprise $k$ input shift registers (250') $k$ being a sub-multiple of H, each input register (250') comprising H/$k$ stages (251'), each stage (251') being fed by a coder, (1', 2', ...) the said input shift registers (250') being filled at a frequency $Fv = F_H/k$ and read every $1/Fv$, the outputs of the said shift registers (250') being connected to a bus bar system (300') comprising $k$ bars (350') in parallel, each of them being connected to the output of a shift register (250') and in that the sampling means (400') comprise at the most H/$k$ groups (420''') of 4 sampling shift registers (450''', 451''', 452''', 453'''), each group (420''') being constituted by 2 pairs (470''', 471''') of registers and each pair being constituted by a first and a second register in series, each group (420''') comprising a pair (470''') of registers which register when the other (471''') discharges, the parallel input of the $i^{th}$ stage of each register (450''', 451''', 452''', 453''') of each group (420''') being connected to the $i^{th}$ bus bar (350'), $i$ assuming all the values from 1 to $k$, each of the inputs of each secondary adder (50') being connected to the output of an associated switch (430''') comprising 2 inputs, one of the inputs of each switch (430''') being connected to the parallel output of one of the $k$ stages of the first register (450''') of one of the pairs (470''') of a determined group (420'''), the other input being connected to the parallel output of the stage having the same order of the first register (452''') of the other pair (471''') of the same group (420'''), the unblocking of the parallel inputs (461''') of the sampling registers (450''', 451''', 452''', 453''') being effected by control means (500'), $k$ consecutive stages of the pairs (470''', 471''') of sampling registers being emptied at the frequency $F_H$.

18. Device for forming channels according to claim 17, characterized in that the said control means (500') comprise an address register (610') forming a looped circuit and constituted by H/$k$ stages (611') whose parallel inputs (621') are connected to the outputs of a multiplexer (630') having H/$k$ outputs (631'), the said multiplexer (630') being fed by a unit signal distributed sequentially at the frequency $Fv$ from an output of the multiplexer (620') to the following output, the said address register (610') being charged by the said multiplexer every 1/$Fv$, the circulating of the unit signal in the H/$k$ stages (611') of the address register (610') being effected at the frequency $Fd = Fv.H/k$, the signals obtained at the parallel outputs (621') of the H/$k$ stages (611') used for unblocking the parallel inputs (461''') of the stages (460''') of the groups (420''') of sampling registers (450''', 451''', 452''', 453'''), the unblocking of the $k$ stages (460''') of the first register (450''') of a pair (470''') of a group (420''') being controlled by a stage (611''') of the address register (610'''), the $k$ stages of the second register (451''') of the same pair (470''') being controlled by the following stage (611') of the address register (610').

* * * * *